(12) United States Patent
Sharifi et al.

(10) Patent No.: US 10,819,528 B2
(45) Date of Patent: Oct. 27, 2020

(54) DEVICE SECURITY WITH PHYSICALLY UNCLONABLE FUNCTIONS

(71) Applicant: Square, Inc., San Francisco, CA (US)

(72) Inventors: Kamran Sharifi, Toronto (CA); Afshin Rezayee, Richmond Hill (CA); Jeremy Wade, San Francisco, CA (US); Yue Yang, Thornhill (CA); Max Joseph Guise, San Francisco, CA (US); Bertram Leesti, Toronto (CA)

(73) Assignee: Square, Inc., San Francisco, CA (US)

( * ) Notice: Subject to any disclaimer, the term of this patent is extended or adjusted under 35 U.S.C. 154(b) by 357 days.

(21) Appl. No.: 15/844,510

(22) Filed: Dec. 15, 2017

(65) Prior Publication Data

US 2019/0028282 A1 Jan. 24, 2019

Related U.S. Application Data

(60) Provisional application No. 62/534,181, filed on Jul. 18, 2017.

(51) Int. Cl.
*H04L 29/06* (2006.01)
*H04L 9/32* (2006.01)
(Continued)

(52) U.S. Cl.
CPC ........ *H04L 9/3278* (2013.01); *G06F 11/1068* (2013.01); *G06F 21/75* (2013.01);
(Continued)

(58) Field of Classification Search
CPC . H04L 9/3278; H04L 9/0866; H04L 2209/34; H04L 2209/56; G06F 21/75; G06F 11/1068; G06F 21/86; G11C 7/24; G11C 29/52; G11C 2029/4402; G11C 2029/0411; G06Q 20/3829;
(Continued)

(56) References Cited

U.S. PATENT DOCUMENTS 4,914,394 A * 4/1990 Meyer .................... G01R 27/06
324/533
7,837,110 B1 11/2010 Hess et al.
(Continued)

FOREIGN PATENT DOCUMENTS

| EP | 2 615 571 A1 | 7/2013 |
| KR | 10-1566949 B1 | 11/2015 |
| WO | 2019/018557 A1 | 1/2019 |

OTHER PUBLICATIONS

Notice of Allowance dated Dec. 3, 2018, for U.S. Appl. No. 15/942,288, of Rezayee, A., et al., filed Mar. 30, 2018.
(Continued)

*Primary Examiner* — Kendall Dolly
(74) *Attorney, Agent, or Firm* — Maynard Cooper & Gale, P.C.; Joe E. Holland, Esq.

(57) ABSTRACT

A device may include one or more sources such as circuit elements and electrical components that function as sources for physically unclonable function (PUF) data. PUF data may be acquired from the PUF sources and one or more error correction codes may be applied to the PUF data. The resulting PUF values may be used to generate information that may be used for device security operations such as encryption and tamper detection.

23 Claims, 12 Drawing Sheets

(51) Int. Cl.

| | | |
|---|---|---|
| *G06Q 20/32* | (2012.01) | |
| *G06F 11/10* | (2006.01) | |
| *G06Q 20/34* | (2012.01) | |
| *G11C 29/52* | (2006.01) | |
| *G06F 21/86* | (2013.01) | |
| *G06F 21/75* | (2013.01) | |
| *G11C 7/24* | (2006.01) | |
| *H04L 9/08* | (2006.01) | |
| *G06Q 20/38* | (2012.01) | |
| *G06Q 20/20* | (2012.01) | |
| *G11C 29/44* | (2006.01) | |
| *G11C 29/04* | (2006.01) | |

(52) U.S. Cl.
CPC ........... *G06F 21/86* (2013.01); *G06Q 20/202* (2013.01); *G06Q 20/3278* (2013.01); *G06Q 20/341* (2013.01); *G06Q 20/3823* (2013.01); *G06Q 20/3825* (2013.01); *G06Q 20/3829* (2013.01); *G11C 7/24* (2013.01); *G11C 29/52* (2013.01); *H04L 9/0866* (2013.01); *G11C 2029/0411* (2013.01); *G11C 2029/4402* (2013.01); *H04L 2209/34* (2013.01); *H04L 2209/56* (2013.01)

(58) Field of Classification Search
CPC ............. G06Q 20/3825; G06Q 20/202; G06Q 20/3823; G06Q 20/3278; G06Q 20/341
See application file for complete search history.

(56) References Cited

U.S. PATENT DOCUMENTS

| | | | |
|---|---|---|---|
| 9,501,664 B1* | 11/2016 | Hamlet | ............. G06K 9/00577 |
| 2008/0078982 A1 | 4/2008 | Min et al. | |
| 2008/0106605 A1* | 5/2008 | Schrijen | ................ H01L 23/576 |
| | | | 348/207.99 |
| 2009/0083833 A1* | 3/2009 | Ziola | ..................... H04L 9/3271 |
| | | | 726/2 |
| 2010/0031065 A1* | 2/2010 | Futa | ...................... H04L 9/0866 |
| | | | 713/194 |
| 2010/0176920 A1* | 7/2010 | Kursawe | ............... G06F 21/602 |
| | | | 340/5.74 |
| 2012/0120733 A1 | 5/2012 | Son et al. | |
| 2013/0141137 A1* | 6/2013 | Krutzik | .................... G09C 1/00 |
| | | | 326/8 |
| 2016/0080158 A1 | 3/2016 | Gehrer | |
| 2016/0182045 A1 | 6/2016 | Mai et al. | |
| 2017/0257222 A1 | 9/2017 | Pedersen et al. | |
| 2018/0096172 A1 | 4/2018 | Lu | |
| 2019/0026724 A1 | 1/2019 | Wade et al. | |
| 2019/0028283 A1 | 1/2019 | Sharifi et al. | |
| 2019/0028284 A1 | 1/2019 | Rezayee et al. | |
| 2020/0051062 A1 | 2/2020 | Wade et al. | |
| 2020/0219085 A1 | 7/2020 | Sharifi et al. | |

OTHER PUBLICATIONS

Final Office Action dated Dec. 6, 2018, for U.S. Appl. No. 15/942,299, of Wade, J., et al., filed Mar. 30, 2018.
International Search Report and Written Opinion for International Application No. PCT/US2018/042741, dated Sep. 18, 2018.
Notice of Allowance dated May 24, 2019, for U.S. Appl. No. 15/942,299, of Wade, J., et al., filed Mar. 30, 2018.
Notice of Allowance dated Dec. 28, 2018, for U.S. Appl. No. 15/942,288, of Rezayee, A., et al., filed Mar. 30, 2018.
Advisory Action dated Feb. 25, 2019, for U.S. Appl. No. 15/942,299, of Wade, J., et al., filed Mar. 30, 2018.
Non-Final Office Action dated Jun. 22, 2018, for U.S. Appl. No. 15/942,299, of Wade, J., et al., filed Mar. 30, 2018.
Non-Final Office Action dated Jun. 29, 2018, for U.S. Appl. No. 15/942,288, of Rezayee, A., et al., filed Mar. 30, 2018.
Office Action received for European Application No. 18755987.7, dated Aug. 3, 2020.

* cited by examiner

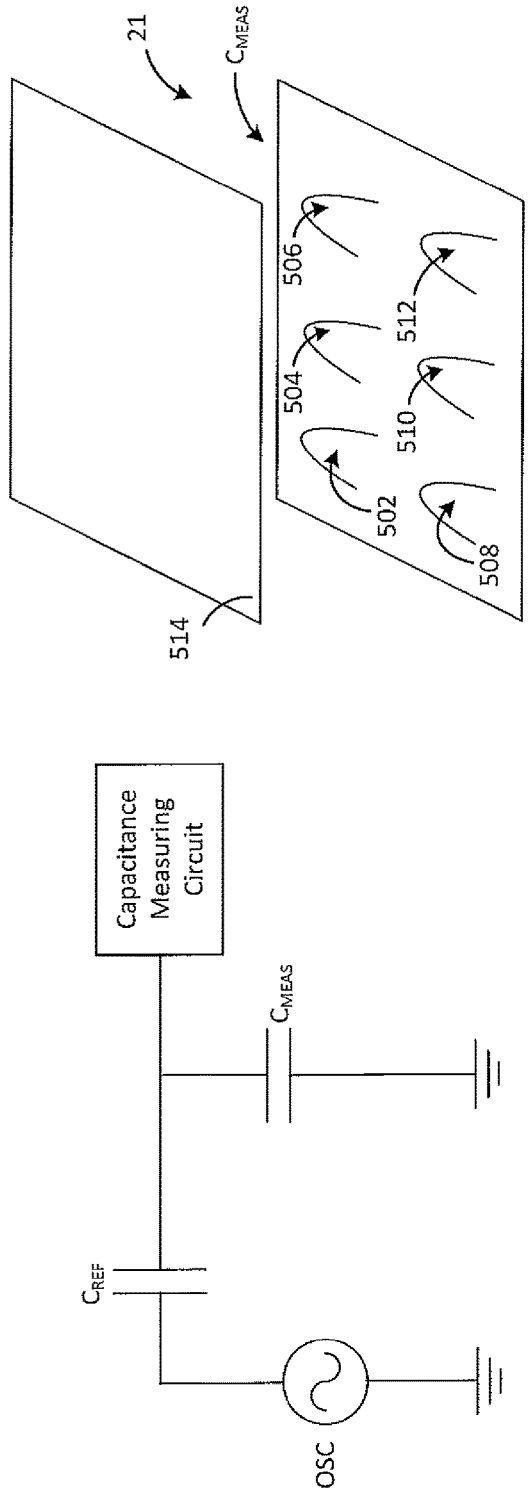
FIG. 6A
FIG. 6B
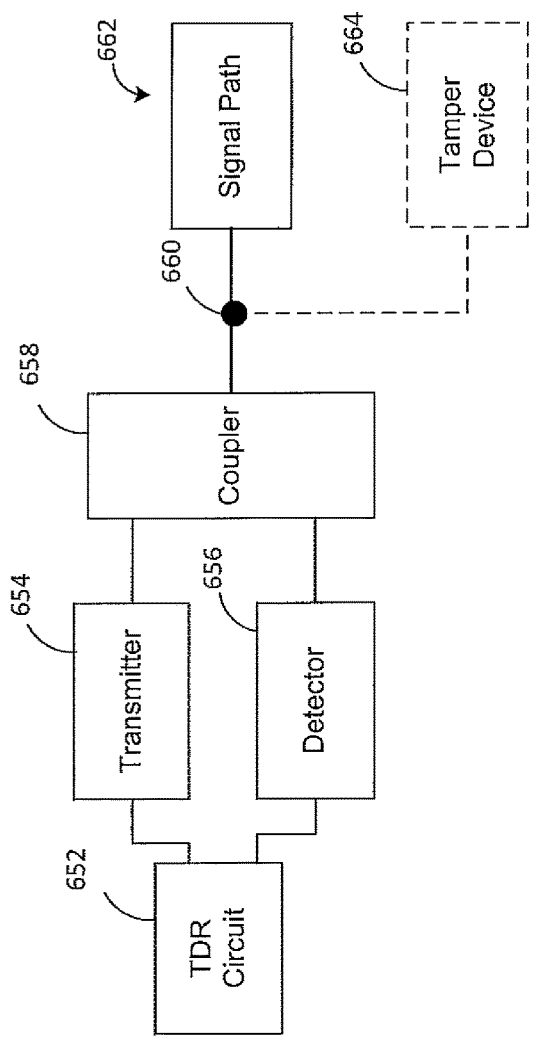
FIG. 6C

DEVICE SECURITY WITH PHYSICALLY UNCLONABLE FUNCTIONS

CROSS REFERENCE TO RELATED APPLICATION

This application claims priority to U.S. Provisional Application No. 62/534,181, entitled "Device Security with Physically Unclonable Functions" and filed on Jul. 18, 2017, which is incorporated herein by reference.

BACKGROUND

Electronic devices may perform operations involving critical information such as personally identifying information, account information, medical information, business information, or various other types of sensitive information that has economic or other value. Such devices may be ripe targets for hackers or other attackers who seek to access such critical information through eavesdropping or hacking devices. For example, an attacker may attempt monitor signals that are transmitted to or received by devices, as well as signals that are internal to the devices. This may be done by non-invasive or invasive means. In many cases, attackers attempt to physically access components of the device, such as one or more communication lines carrying data or a processor that communicates and processes payment information. Attackers may also attempt to simulate an external device or internal components of the device under attack. Accordingly, device makers employ a variety of methods to encrypt and protect critical information, safely store cryptographic information, and to identify and prevent tamper attempts.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 6A depicts an exemplary line capacitance-based physically unclonable function measurement in accordance with some embodiments of the present disclosure;

FIG. 6B depicts an exemplary chip card interface for measurement in accordance with physically unclonable function derivation in accordance with some embodiments of the present disclosure;

FIG. 6C depicts an exemplary line time domain reflectometry-based physically unclonable function measurement in accordance with some embodiments of the present disclosure;

DETAILED DESCRIPTION

Figure 1:
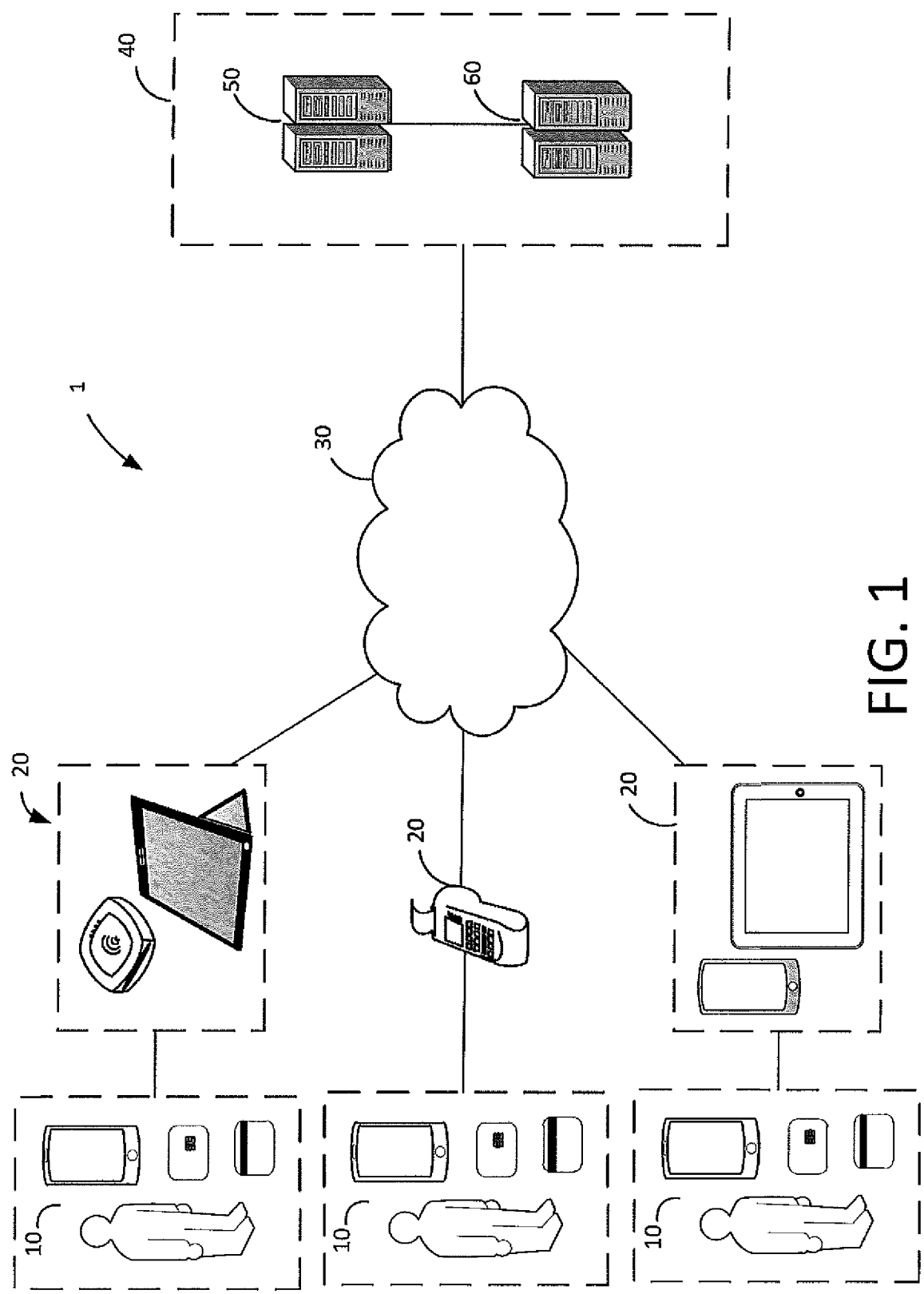
FIG. 1 shows an illustrative block diagram of a payment system in accordance with some embodiments of the present disclosure.

An electronic device such as a payment reader may include cryptographic processing capabilities and tamper protection devices. For example, cryptographic operations may be performed within a unique portion of the electronic device (e.g., physically and/or logically segregated) such that critical information is only provided to external devices or portions of the electronic device in encrypted form. Tamper protection devices may include a variety of physical and electrical components (e.g., tamper lines, tamper meshes, temperature monitors, voltage monitors, clock monitors, tamper domes, tamper coatings, line-detection tamper devices, RF tamper detection components, etc.) to identify and prevent eavesdropping and tamper detection attempts.

In an exemplary embodiment of a payment reader including EMV card, swipe card, or NFC payment capability, there are multiple opportunities for an attacker to attempt to obtain critical information such as payment information or to otherwise engage in fraudulent transactions. For example, an attacker may attempt to intercept NFC communications, read data being communicated over the physical connections with the EMV card, or intercept that data from the magnetic stripe of a traditional swiping transaction. Moreover, signals carrying this and other critical information are transmitted within the payment reader and processed by processors and other circuitry of the payment reader.

Accordingly, numerous types of tamper detection devices such as temperature monitors and voltage monitors are integrated into an exemplary payment reader. These tamper detection devices can sense attempts to gain improper physical access to the payment reader (e.g., by opening the payment reader or drilling into the payment reader to access signals or components), attempts to physically provide electrical signals to the payment reader (e.g., attempts to inject malicious signals into externally accessible pins of the payment reader, such as EMV pins), and attempts to wirelessly introduce malicious signals to the payment reader. Some tamper detection devices may generate a response such as opening a circuit in response to tamper attempt.

In some embodiments, cryptographic and/or tamper operations may be performed in concert with physically unclonable functions (PUFs) that include characteristics of physical components that may be used to generate unique patterns of bits based on variations in the physical components, and for which those variations are difficult to duplicate. One or more PUFs may be utilized for encryption, for example, as a source of key values, as seed values for encryption, or in other similar manners. Because the PUF value is unique to the physical structure that is the source of the PUF value, it may be possible to acquire the PUF value directly from the physical component, rather than storing such value in memory of the device. In some embodiments, multiple PUF values may be generated from multiple physical structures, and may be combined to make a key or otherwise used to generate key and other cryptographic values. In some embodiments, at least a portion of the PUF may be based on physical components that respond to tamper attempts, such that any cryptographic keys or other critical information that is generated by or encrypted by the PUF may become unreadable upon the occurrence of a tamper attempt. In some embodiments, error correction methods may be employed to recover PUF data even in the absence of a 100% of the data. Such error correction may be tiered such that only certain operations may be performed (e.g., performing shut down operations, receiving firmware updates, or communicating records of tamper attempts to another device such as a remote server. PUFs may be based on a variety of physical parameters such as startup values of electronic components such as SRAM, delay values of electronic components such as inverters, impedance of traces or physical components such as printed circuit boards, antennas, RF transmission characteristics of antennas and related transmission circuitry, measurements of touch screens or microphones, reflected light or audio signals, vibration sensing, physical responses of electromechanical systems (e.g., microelectromechanical circuits), and other electrical or mechanical systems resident on the devices.

In an embodiment, a device tamper may include an activity that attempts to alter a pre-defined functionality of a device such as a payment reader, retrieve its protected information, or mimic its identity in a non-authorized way. For example, in a mechanical tamper, the device is opened to expose the critical signals and monitor the information that is transferred using those signals. An electronic chip-level tamper can expose the critical content of the memory to reveal the secret keys preserved in that memory.

In some instances, a target device for a tamper attempt may include critical information such as a unique ID that facilitates the establishment trust with an authority (e.g., a remote payment service system or payment card issuer) and to allow the device to authenticate itself for certain functions. One way to create a unique ID is based on unique properties of the device (one or more device PUFs) in such a way that these properties remain unique to that device, but they vary device-to-device. An exemplary PUF may be system-based (e.g. it may be derived from the unique property of its printed circuit board electrical traces, discrete components, physical enclosures, etc.) or can be silicon-based (e.g. it can be derived from the unique properties of certain silicon blocks such as memory or portions thereof). The PUF identifier may act as an electronic fingerprint of the system for performing various operations such as cryptographic operations.

Exemplary PUFs may sense a tamper attempt and provide a response, for example, by disabling certain functionality or modifying aspects of the PUF itself (e.g., tripping one or more fuses to change the values that may be read for the PUF. This may be performed by the PUF automatically (e.g., the PUF or some portion thereof is itself used for tamper detection) or may be performed based on independent tamper detection and PUF modification. In this manner, the PUF may be able to erase/eliminate any critical information (e.g., its own unique "fingerprint" ID, or the subsequently-derived secret keys) upon a tamper event. In some embodiments, the modification of the PUF or removal of access to the PUF may be modified only temporarily while an analysis of a tamper attempt is performed (e.g., by the device itself and/or a remote server). In other embodiments, the functionality of the PUF (e.g., the unique ID associated with the PUF) can be irreversibly suppressed, if desired, by using an external input that is integrated with the PUF implementation.

Multiple PUFs may be combined, as may multiple PUF types (e.g., a system-based PUF may be combined with a silicon-based PUF). Such a combination may provide for enhancements to PUF functionality and uniqueness, and may provide for automatic tamper detection even when a portion of the PUF (e.g., a silicon-based PUF) is not easily modified or disabled. In some embodiments, multiple PUF combinations may be available to provide for multiple IDs that may be used for a multiplicity of applications and operational modes.

Implementing a PUF-based device protection system may alleviate the need to store a secret key in any physical memory, on-chip or off-chip, since the PUF-based unique ID's reside only in hardware on which they are based.

FIG. 1 depicts an illustrative block diagram of a payment system 1 in accordance with some embodiments of the present disclosure. In one embodiment, payment system 1 includes a payment device 10, payment terminal 20, network 30, and payment server 40. Although the PUF-based systems of the present disclosure may be implemented in a variety of devices, in an exemplary embodiment described herein the device may be a payment terminal (e.g., a payment reader of a payment terminal). In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. As described herein, in some embodiments some or all of the encryption and authentication process may be performed based on information obtained from one or more PUFs of the payment terminal 20.

Payment server 40 may determine whether the transaction is authorized based on this received information as well as information relating to customer or merchant accounts, and responds to payment terminal 20 over network 30 to indicate whether or not the payment transaction is authorized. The authorization may be performed based on predetermined or known information about the one or more PUFs, which may be established based on an initialization process as described herein. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In some embodiments, an attacker or other user may attempt to acquire payment information by monitoring transmissions or gaining access to components of payment system 1. As an example, each of these components of payment system 1 may provide an opportunity for an attacker to eavesdrop on payment and transaction information or to inject malicious signals. For example, an attacker may attempt to monitor signals that are relayed between any of payment device 10, payment terminal 20, network 30, and payment server 40. In some embodiments, transmissions sent or received by components of payment system 1 may be encrypted. In other attacks, an attacker may attempt to substitute a counterfeit component for one of the components of payment system 1, for example, by creating a counterfeit payment device 10 or payment terminal 20, or by attempting to intercept or redirect communications to network 30 or payment server 40. In yet other attacks, an attacker may attempt to modify one of the components of the payment system 1, for example, by modifying one or more of the payment device 10, payment terminal 20, or payment server 40 to eavesdrop or inject malicious signals or extract key values stored in memory.

The devices of payment system 1 may have a combination of suitable hardware and software to utilize one or more PUFs (e.g., established based on physical components of the payment terminal 20). The PUFs may facilitate authentication of devices and encryption of information in a manner that prevents attacks. Because the keys that are generated by the PUFs are not stored in memory (i.e., the PUF values are "stored" in the physical component itself) an attacker may be unable to obtain useful physical access to ID and/or key information. Multiple PUFs may be utilized together to create keys and IDs, and different keys and IDs may be utilized in a variety of situations. In some embodiments, aspects of the operation of the PUFs and information about tamper attempts may be provided by payment terminal 20 to payment server 40. Payment server 40 may have hardware and software that facilitates the monitoring of the tamper hardware and PUFs and may provide corrective action or provide instructions to modify the manner of operation of the payment terminal 20 and any suitable component thereof. In some embodiments, the payment server 40 may provide firmware that modifies the operation of the payment terminal 20 and PUFs, for example, by utilizing different subsets of PUFs for different operations, modifying error correction thresholds, and changing encryption levels for different operations and communications of the payment terminal 20.

Figure 2:
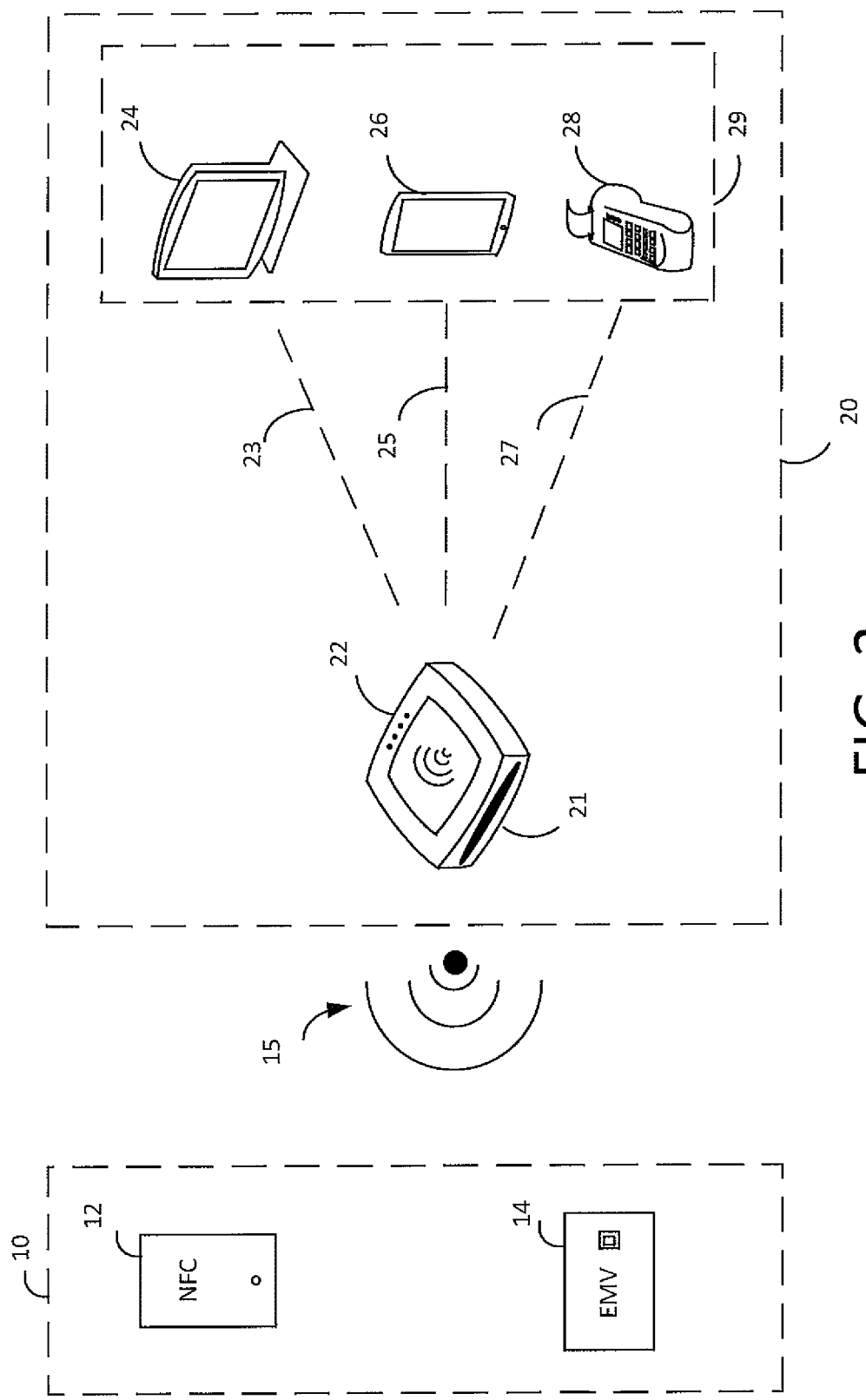
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20

(e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

In some embodiments, the application running on the merchant device 29 may receive information about tamper attempts and PUF operations. For example, information about tamper attempts and PUF operations may be provided such that the application of the merchant device requests information about whether a particular tamper attempt is occurring (e.g., such as visual confirmation that the device is not being touched, or instructions for performing operations such as power cycling to modify device status). Information may also be provided by the merchant device 29 to the payment reader 22 to provide information that software of payment reader 22 may utilize to analyze a possible tamper attempt (e.g., geographic information, temperature information, auxiliary sensor information such as sound, video, motion, or infrared data determined from sensors of the merchant device 29, or that content of certain registers in the software that are designed to record the tamper event, etc.).

Figure 3:
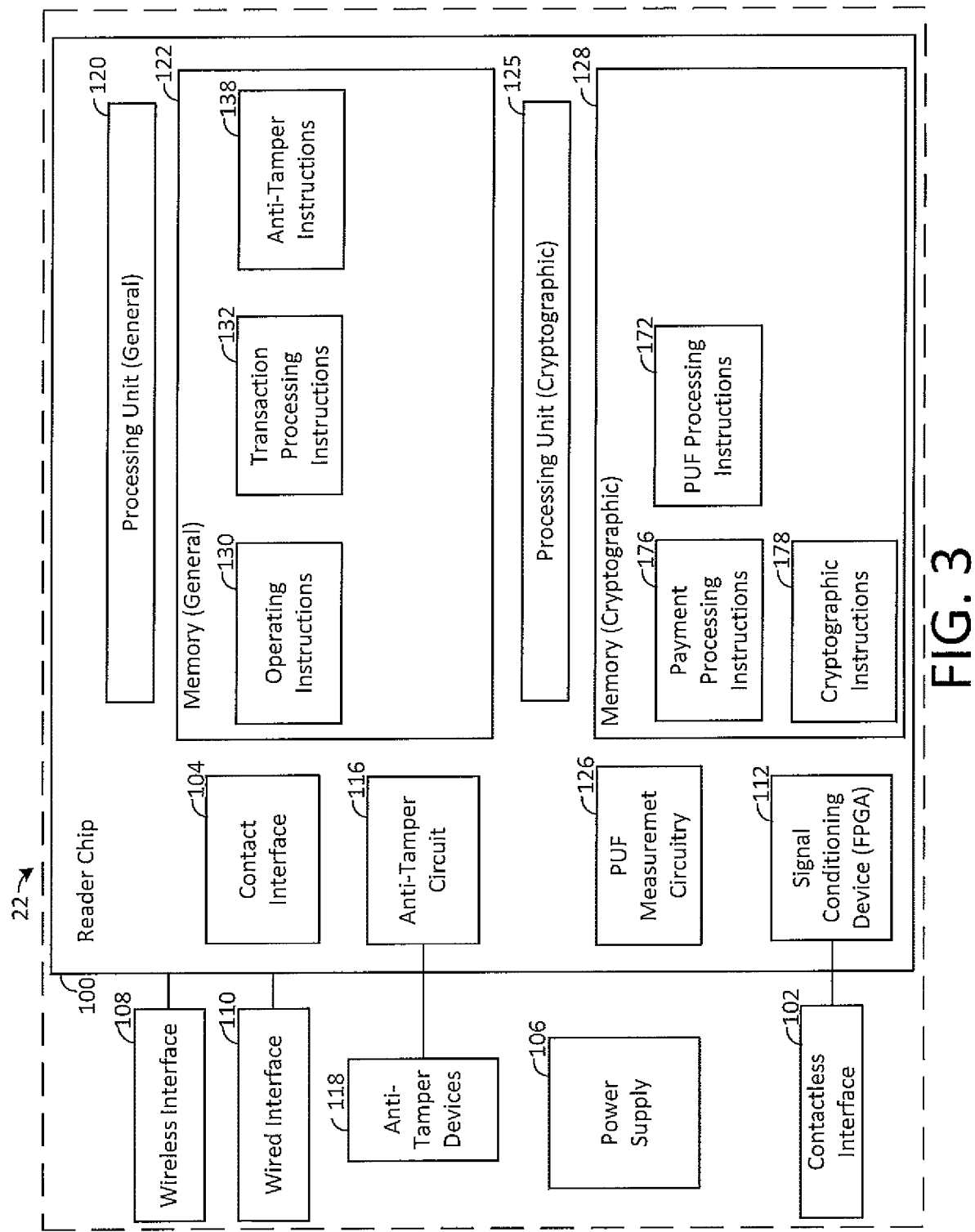
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in a suitable manner. In one embodiment, payment reader 22 includes a reader chip 100, a plurality of payment interfaces (e.g., a contactless interface 102 and a contact interface 104), a power supply 106, a wireless communication interface 108, a wired communication interface 110, a signal conditioning device 112 and anti-tamper devices 118. In an embodiment, the reader chip 100 of payment reader 22 may include a general processing unit 120, general memory 122, a cryptographic processing unit 125 and cryptographic memory 128, an anti-tamper circuit 116, a contact interface 104, and NFC signal conditioning device 112.

In exemplary embodiments, any suitable components or combinations thereof may be utilized to as a source for PUF data, including physical interfaces, circuit traces, wires, discrete components, memories, logical operations, FPGAs, antennas, terminals, enclosures, test points, sensors, cameras, and other similar components. As described herein, the physical components forming the PUF or PUFs may have unique physical characteristics that may be accessed or measured, such as by accessing analog values (e.g., current, voltage, etc.) or digital values associated with the components, measuring physical properties (length, impedance, complex signal characteristics, capacitance, resistance, inductance, RF characteristics, load, initial start-up values, etc.) of components, and performing other suitable analysis or measurements to derive PUF values.

Although in one embodiment the processing units memories, contact interface 104, signal conditioning device 112, and anti-tamper circuit 116 will be described as packaged in a reader chip 100, and configured in a particular manner, it will be understood that general processing unit 120, general memory 122, a cryptographic processing unit 125 cryptographic memory 128, contact interface 104, signal conditioning device 112, and anti-tamper circuit 116 may be located and configured in other suitable manners to perform the functionality of the payment reader 22 as is described herein. It will also be understood that the functionality of reader chip 100 may be embodied in a single chip or a plurality of chips, each including any suitable combination of processing units, memory, and other components to collectively perform the functionality of reader chip 100 described herein.

In some embodiments, reader chip 100 may be a suitable chip having a processing unit. Processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions provided from any suitable number of memories and memory types. In some embodiments, processing unit 120 may have multiple independent processing units, for example a multi-core processor or other similar component. In an embodiment, processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that describes the configuration of hardware, such as hardware description language (HDL) software), computer readable instructions running on a processor, or any suitable combination thereof.

A processor may run software to perform the operations described herein, including software accessed in machine readable form on a tangible non-transitory computer readable storage medium. In some embodiments, components of the processing unit (e.g., clock sources, transistors, terminals, etc.) or characteristics of the processing unit (e.g., time to perform different computational operations and workloads) may be utilized to establish PUF values. In an embodiment, the processor may use internal voltage regulator blocks to establish PUF. The processor may use transient I/O values to establish PUF. The processor may also use transient aspect of the electronic system to generate a random number to be used in conjunction with PUF.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but do not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory (embedded or non-embedded), disks or optical storage, magnetic storage, or any other non-transitory medium that stores information that is accessed by a processor or computing device. In some embodiments one or more memory components may be utilized as a PUF source, e.g., based on fabrication process variation, basic transistor parameters variation, metal layer variation (e.g., change in width of metal strips), etc. Digital or other values for the memory may be read from the memory (e.g., digital values from SRAM) under certain conditions in which the physical state of the memory may correspond to the unique PUF value (e.g., at startup or after certain conditions (applied voltages, currents, control signals, etc.) are applied to the memory.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, HDMI and Lightning), circuitry for interfacing with other communication interfaces or buses (e.g., $I^2C$, SPI, UART, and GPIO), and circuitry for interfacing with a power supply 106 (e.g., power management circuitry, power conversion circuitry, rectifiers, and battery charging circuitry). Characteristics of such circuitry including component values and physical measurements of other component characteristics may be utilized to form all or a portion of a PUF value, as may information such as processing or communication speed of components or buses.

In an exemplary embodiment, reader chip 100 may perform functionality relating to processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (e.g., general memory 122 and cryptographic memory 128). In this manner, specific cryptographic processing and critical security information (e.g., cryptographic keys, passwords, user information, etc.), may be securely stored by cryptographic memory 128 and processed by cryptographic processing unit 125. In some embodiments, cryptographic processing unit 125 and/or cryptographic memory 128 may function as a PUF in a similar manner as processing unit 120 and/or memory 122, as described herein.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In this manner, reader chip 100 can process transactions and communicate information regarding processed transactions (e.g., with merchant device 29). In some embodiments, characteristics of these communications (e.g., response speed to certain commands or communications) or measurements of characteristics of the buses, traces, and components that facilitate these communications may provide a source for acquiring PUF information. Other characteristics may be protocol based, such as the sequence of ack/nak, parity, CRC, flow control, etc.

Reader chip 100 may also include circuitry for implementing a contact interface 104 (e.g., power and communication circuitry for directly interfacing with an EMV chip of a chip card 14 that is inserted into slot 21). In some embodiments, reader chip 100 also may also include a signal conditioning FPGA 112 and analog front end circuitry for interfacing with contactless interface 102 (e.g., electromagnetic compatibility (EMC) circuitry, matching circuits, modulation circuitry, and measurement circuitry). Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as payment information. Note that, in some embodiments, contact interface 104 may be housed on reader chip 100 and may communicate with the various components of reader chip 100 via any suitable means (e.g., a common internal bus). Aspects of any of these components may be queried or measured to acquire PUF information as described herein. For example, analog and/or digital values associated with particular operational states of the components of contact interface (e.g., traces, discrete components, card interface, terminals, etc.) may be determined or measured based on initial states or particular applied signals. Other sources for acquiring PUF information may include transient and/or random delay in transmitting bits of information over the contact card interface and variations in voltage levels used to transmit and receive data.

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHz. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information. In some embodiments, one or more characteristics of the contactless interface may be measured, or the contactless interface may be used to measure other operational characteristics of the device such as RF emissions. For example, other components of the device may have characteristic RF emissions that may be sensed by the contactless interface when it is not emitting a NFC carrier or data signal. Other components may be cycled through various operational routines (e.g., frequency, power, waveform) that may impact the manner in which a resulting periodic signal is sensed by the contactless interface and provide a source of PUF information. Moreover, the contactless interface 102 transmit and receive paths include one or more antenna portions, matching circuitry, filters, amplifiers, and other similar components that may be directly measured or assessed for obtaining PUF values. Exemplary characteristics that may be utilized to obtain PUF values may include mutual inductance, electromagnetic coupling factor, electromagnetic permeability of antennas and/or ferrite material, and other similar factors.

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components. In certain embodiments, power supply voltages, currents, power outputs, Main battery initial charge value, depletion rate, charge rate, coin cell battery initial charge value, and responses to certain command or query signals may provide unique values that may provide a source of unique PUF information.

Payment reader 22 may provide an appealing target for an attacker, since, as described above, it provides a central point for receiving payment via multiple interfaces and for communicating that information with other devices (e.g., merchant device 29). Attackers may attempt to tamper with payment reader 22 in order to access internal electrical connections that carry signals to the various payment interfaces or communication interfaces, or processors or other circuitry of payment reader 22. Accordingly, payment reader 22 may include numerous mechanisms for monitoring and preventing attempts to tamper with the hardware of payment reader 22, such as anti-tamper devices 118. For example, in some embodiments, anti-tamper devices 118 of payment reader 22 may include tamper switches that change their electrical state in response to an attempt to open the housing of payment reader 22, insert a device other than a payment card into payment slot 21 or a magnetic stripe reader, place an improper device in proximity to the NFC interface of payment reader 22, or otherwise attempt to gain physical or electrical access to any components of payment reader 22.

In some embodiments, anti-tamper devices 118 may comprise a tamper switch, which may be a component that changes its electrical state in response to a physical stimulus. Exemplary tamper switches may be located at various locations of a payment reader 22, such that any attempt to open the enclosure of payment reader 22, or to modify the physical structure of payment reader 22, may cause the tamper switch to change its physical state (e.g., resulting in an open circuit).

In some embodiments, anti-tamper devices 118 may comprise a tamper switch that changes its electrical state in response to an electrical stimulus. An exemplary payment reader 22 may have a number of connection points at which it is possible to apply an electrical signal to the connection points. For example, in some embodiments a payment slot 21 (FIG. 2) of payment reader 22 may have EMV pins that interface with corresponding pins of an EMV card. An attacker may attempt to access those pins to monitor the pins (e.g., the I/O pin) or to provide malicious signals to payment reader 22 (e.g., by spoofing an EMV card). In some embodiments, a tamper switch may respond to signals that do not match expected signal characteristics (e.g., current, voltage, duty cycle, waveform, capacitance, etc.) and modify its electrical state (e.g., by opening a circuit, closing a circuit, modifying an electrical signal's amplitude or phase, etc.). Although such a tamper switch has been described in the context of the pins of an EMV payment slot 21 (FIG. 2), it will be understood that such a tamper switch may be implemented on any electrical signal lines or connections of payment reader 22.

In some embodiments, an attacker may attempt an attack that does not require physical access to the payment reader 22, for example, by sending radio frequency (RF) electromagnetic signals in order to create or modify a signal within payment reader 22, or to temporarily or permanently disable or modify the operation of one or more components of the payment reader 22. Exemplary anti-tamper devices 118 may comprise a tamper switch that may respond to sensed characteristics of RF signals that are abnormal or correspond to an attack, such as a signal strength, waveform, frequency, duty cycle, etc. In response to such sensed characteristics the tamper switch may modify its electrical state (e.g., by opening a circuit, closing a circuit, modifying an electrical signal's amplitude or phase, etc.).

Another exemplary anti-tamper device 118 may comprise a tamper mesh that may provide for a complete enclosure of the internal components of the payment reader 22 or critical components thereof. In some embodiments, a tamper mesh may include conductive traces in close proximity and creating a pattern that covers the protected components. It may be difficult to gain physical access to the components without damaging the conductive mesh due to the unique and dense pattern of the tamper mash. This results in a change in the electrical state of the tamper mesh (e.g., by opening a circuit, closing a circuit, modifying an electrical signal's amplitude or phase, etc.) that may be used to sense a tamper attempt and take corrective action.

In some embodiments, an anti-tamper device 118 may comprise an anti-tamper temperature circuit for measuring a temperature within payment reader 22, comparing the measured temperature against one or more threshold temperatures, and performing a response when a tamper attempt is detected. The anti-tamper temperature circuit may comprise temperature sensing components (e.g., polysilicon resistor circuitry) and any combination of hardware, software or otherwise for comparing the temperature within payment reader 22 with a threshold. In some embodiments, anti-tamper temperature circuit may be coupled to other anti-tamper devices 118 (e.g., tamper switch) for controlling operation of the anti-tamper devices 118 (e.g., shutting down the anti-tamper device 118) in response to a measured temperature or a comparison of a measured temperature with one or more pre-defined temperature thresholds.

Any of the anti-tamper devices 118 or any suitable combination thereof may provide a source for obtaining PUF information. For example, physical characteristics of the anti-tamper devices (e.g., capacitance, response to voltages or currents, impedance, other component measurements, physical configuration or length of tamper traces, physical size of tamper devices, temperature response of components, and other suitable characteristics) may be determined or measured to acquire PUF information. Because the anti-tamper devices 118 change their physical characteristics in response to tamper attempts, utilizing anti-tamper devices to acquire PUF information may result in an automatic response to attacks, since the underlying PUF values may change in a manner that prevents the use of the PUF for encryption and authentication after the tamper event has occurred. In some embodiments, the printed circuit board (PCB) may include special areas of PCB dedicated to PUF sources.

In some embodiments, monitoring of the anti-tamper devices 118 may be initially performed by an anti-tamper circuit 116 (e.g., that may operate in a low power mode or based on an alternative low power source). The monitoring may be performed periodically or in some embodiments the timing of monitoring may be randomized (e.g., based on a random number generator) such that the timing of the monitoring is not predictable (e.g., by selectively providing power to the real time clock based on a randomized pattern). By only monitoring the tamper devices for a portion of the time it may be possible to achieve a small average current consumption by the anti-tamper circuit 116 and tamper devices 118.

In an embodiment, anti-tamper circuit 116 may provide notifications to other components of the payment reader 22 that a tamper attempt has been detected. Notifications may be stored (e.g., in a memory associated with the anti-tamper circuit 116) to be provided to other components of the payment reader 22 (e.g., processing unit 120) when they receive power, or in some embodiments, may be provided (e.g., as an interrupt) in a manner that causes one or more components to wake up. Once a tamper attempt is identified, the tamper attempt may be recorded and/or processed, e.g., by taking corrective action, providing notifications, deleting critical information (e.g., from cryptographic memory 128), disabling communication interfaces, modifying physical characteristics of PUFs or disabling access to PUFs, modifying error correction procedures associated with PUFs, any other suitable response, or any combination thereof. In some embodiments, some or all of this processing may be performed by the anti-tamper circuit 116.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Aspects of any of these components may be queried or measured to acquire PUF information as described herein. For example, analog and/or digital values associated with particular operational states of the components of wireless communication interface 108 (e.g., traces, discrete components, card interface, terminals, etc.) may be determined or measured based on initial states or particular applied signals. PUF values may be acquired from memory of wireless communication interface 108. In some embodiments, PUF values may be obtained based on electromagnetic (RF) wave propagation patterns measured by a circuitry included in the system.

Wired communication interface 110 may include any suitable interface for wired communication with other devices or a communication network, such as USB, Lightning, HDMI or mobile HDMI, FireWire, Ethernet, any other suitable wired communication interface, or any combination thereof. In some embodiments, wired communication interface 110 may allow payment reader to communicate with one or both of merchant device 29 and payment server 40. Aspects of wired communication interface 110 may be queried or measured to acquire PUF information as described herein. For example, analog and/or digital values associated with particular operational states of the components of wired communication interface (e.g., traces, discrete components, card interface, terminals, etc.) may be determined or measured based on initial states or particular applied signals.

In some embodiments, reader chip 100 may include a signal conditioning device 112 coupled to the contactless interface 102 to process signals provided to and received from the contactless interface 102. Although signal conditioning device 112 may include any suitable hardware, software, or any combination thereof, in an exemplary embodiment signal conditioning device may comprise an FPGA. Signal condition device 112 may condition sent and received signals to and from contactless interface 102, such as when a payment device 10 using NFC communication communicates with payment reader 22. In an embodiment, signal conditioning device 112 may operate based on instructions stored at reader chip 100 (e.g., signal conditioning instructions 136) for use in interacting with the contactless interface 102. Characteristics of the signal conditioning interface may be determined or measured, and utilized as a source for PUF values, as described herein (e.g., based on signal propagation patter, NFC blind spots, antenna impedance, etc.).

In some embodiments, reader 22 may include PUF measurement circuitry, which may be separate from reader chip 100, general processing unit 120, and/or cryptographic processing unit 125, or may be at least partially integrated with some or all of these components. In an exemplary embodiment as described herein, PUF measurement circuitry 126 may be integrated within a secure enclave of the reader 22 in a manner that provides multiple levels of physical and logical tamper protection. PUF measurement circuitry may provide circuitry and interconnections for performing interfacing with and performing measurements of PUF components, and may provide direct or indirect connections to any such PUF source components. For example, PUF measurement circuitry may include digital interfaces for querying memory, C2V converters, voltage and current measurement circuitry, periodic sources, analog sources, digital sources, simulated communications interfaces, battery and power supply measurements, coin cell battery measurements, or other suitable components.

In some embodiments, general memory 122 may be any suitable memory as described herein, and may include a plurality of sets of instructions for controlling operations of payment reader 22 and performing general transaction processing operations of payment reader 22, such as operating instructions 130, transaction processing instructions 132, and anti-tamper instructions 138.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing memories stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers and/or PUF values). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring any suitable information from a chip card (e.g., via contact interface 104 and cryptographic processing unit 125) such as authorization responses, card user name, card expiration, etc.

Anti-tamper instructions 138 may include instructions for operating anti-tamper circuit 116 and anti-tamper devices 118, disabling resources of payment reader 22 when a tamper attempt is detected, and in the absence of a tamper attempt, may permit normal operations of the payment reader 22. In some embodiments, anti-tamper instructions 138 may include instructions for monitoring one or more pins of reader chip 100 (not specifically shown) coupled to one or more resources of anti-tamper circuit 116 to identify detection of a tamper attempt by the anti-tamper circuit 116. For example, anti-tamper instructions 138 may include instructions for monitoring a signal provided to a wake-up pin by an anti-tamper circuit 116, as well as signals that are indicative of a tamper attempt or type of tamper attempt. In some embodiments, some or all aspects of anti-tamper instructions 138 may be stored in cryptographic memory 128 and may be executed by cryptographic processing unit 125.

Anti-tamper instructions 138 may include instructions for taking action when an output of anti-tamper circuit 116 indicates a tamper attempt. In some embodiments, anti-tamper instructions 138 may include instructions for providing a tamper notification, such as to merchant device 29, payment server 40 via network 30, or to a user of payment terminal 20. The tamper notification may comprise a suitable notification, such as a message transmitted via wireless interface 108 or wired interface 110 of payment reader 22 or an audible, visible, or physical alarm signal. In an embodiment, a tamper notification may be provided via a resource of payment reader 22, and may provide a notification to a user of detection of a tamper attempt (e.g., output of light, sound, mechanical vibration, a combination thereof, or other output).

In some embodiments, anti-tamper instructions 138 may include instructions for controlling resources of payment reader 22, for example, in order to limit an intruder's access to information of the payment reader 22. For example, in some embodiments, anti-tamper instructions 138 may include instructions for disabling interfaces of payment reader 22 or PUFs of payment reader 22, for example, to prevent further acquisition or transmission of potentially sensitive data. Anti-tamper instructions 138 may include instructions for general processing unit 120 to provide a signal to disable power supply 106. In this regard, general processing unit 120 may selectively disable a supply of power from power supply 106 to various resources of payment reader 22, such as any of the interfaces of payment reader 22 or reader chip 100.

In some embodiments, anti-tamper instructions 138 may selectively disable resources of payment reader 22 that an attacker may attempt to access in order to acquire potentially sensitive information while permitting other resources (e.g., anti-tamper circuit 116) to continue to operate. For example, anti-tamper instructions 138 may include instructions for removing, erasing, deleting or wiping one or more encryption keys stored in cryptographic memory 128 in order to prevent access to encrypted data when a tamper attempt is detected, causing the provision of signals that may permanently modify a PUF, or removing access to PUF sources. Similarly, anti-tamper instructions 138 may include instructions for removing, erasing, deleting or wiping any suitable information from general memory 122 or cryptographic memory 128, such as user information (e.g., personally identifiable information, financial account information, or otherwise) in response to detection of a tamper attempt. In this regard, anti-tamper instructions 138 may include instructions for continuing to monitor an output of anti-tamper circuit 116 following detection of a tamper attempt and taking steps to further disable operation of payment reader 22 (e.g., completely power down payment reader 22) if one additional tamper attempt is detected within a predetermined amount of time. Anti-tamper instructions 138 may include other instructions for performing other operations in other embodiments.

In some embodiments, anti-tamper instructions 138 may include instructions for collecting tamper attempts that may be identified locally at payment reader 22 or that may be transmitted to an external system (e.g., payment server 40) for storage, analysis, and complex processing of a tamper event (e.g., based on other known tamper events that are occurring in similar circumstances). In some embodiments, such an external analysis may result in a signal being received at general processing unit 120, which may shut off power to one or more components of reader chip 100 or payment reader 22 in response to that input.

Cryptographic processing unit 125 may be any suitable processor as described herein, and, in some embodiments, may perform cryptographic functions for the processing of payment transactions. For example, in some embodiments a cryptographic processing unit 125 may encrypt and decrypt data based on one or more encryption keys provided by PUFs, in a manner that isolates the encryption functionality from other components of payment reader 22 and protects the PUF values from being exposed to other components of payment reader 22 or being stored permanently in memory.

In some embodiments, cryptographic memory 128 may be any suitable memory or combination thereof as described herein, and may include a plurality of sets of instructions for performing cryptographic operations, such as payment processing instructions 176, cryptographic instructions 178, and PUF processing instructions. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

PUF processing instructions 172 may interact with PUF sources and PUF measurement circuitry 126 to obtain PUF data and perform processing based on the PUF data. In some embodiments, PUF measurement circuitry 126 may obtain PUF data from one or more PUF sources and process the PUF data such that a PUF value (e.g., a series of binary values representative of PUF data) is provided to the cryptographic processing 125. In other embodiments, some or all of the PUF data may be provided as raw data by the PUF measurement circuitry as a one or more analog and/or digital values depending on the particular PUF data sources and any additional processing performed by PUF measurement circuitry 126.

In some embodiments, the PUF processing instructions 172 may process the received PUF data or PUF values for use by the cryptographic processing unit 125. In an embodiment where PUF data is provided by multiple PUF data sources, the PUF processing instructions may provide for appropriate processing of the PUF values, for example, to combine the PUF values or perform multi-step processing to generate a final PUF value. In some embodiments, PUF processing instructions may provide for applying error correction codes to received PUF data to extract usable PUF values even if not all received PUF values are correct. Exemplary error correction codes include Binary parity check code, Hamming code e.g. Hamming (7,4), Hamming (63, 57), Hamming (127, 120), and Cyclic Redundancy Check (CRC) codes, e.g., CRC-32. PUF processing instructions 172 may further provide for facilitation of encryption, authentication, initialization, and other steps as provided herein. The PUF values and any encryption keys generated therefrom may only be accessed and stored when necessary, such that they are not stored in non-volatile memory and thus more difficult to access by attackers.

Figure 4A:
FIG. 4A depicts an exemplary anti-tamper mesh capacitance-based physically unclonable function in accordance with some embodiments of the present disclosure.

FIG. 4A depicts an exemplary anti-tamper mesh capacitance-based physically unclonable function in accordance with some embodiments of the present disclosure. In certain embodiments, an anti-tamper mesh may include a pattern of electrical traces that form an overall mesh structure that makes it difficult to access underlying components. Signal traces may be in a variety of patterns and in some embodiments may include one or more series traces that form an open circuit when the series electrical path in broken. The traces may overly each other as depicted in a top view from FIG. 4A, in which vertical lines one represent one series-connected path and horizontal lines represent another series-connected circuit path. In other embodiments additional connections may be provided such that a determination of a tamper attempt is based on other measured parameters such as impedance or frequency response.

Each of the traces of the anti-tamper mesh may be at a potential and may have a particular location with respect to adjacent traces. By connecting adjacent portions of the traces to measurement circuitry (e.g., C2V converter measurement circuitry) a capacitance that is representative of the capacitance between multiple adjacent points of the tamper mesh may be determined. In this manner, an anti-tamper mesh may have numerous capacitance values that may be measured and that may be dependent upon manufacturing processes in a unique and non-repeatable manner. The values may be provided as analog or digital PUF data, and in some embodiments, may be compared to a threshold to establish 0 or 1 binary values associated with a comparison between the measured capacitance and a capacitance threshold.

Figure 4B:
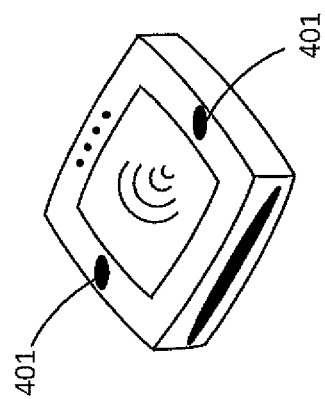
FIG. 4B depicts an exemplary anti-tamper coating-based physically unclonable function in accordance with some embodiments of the present disclosure.

FIG. 4B depicts an exemplary anti-tamper coating-based physically unclonable function in accordance with some embodiments of the present disclosure. In an embodiment, some or all of one or more interior or exterior surfaces of the device (e.g., payment reader 22) may be coated with one or more layers having known conductive properties (e.g., a single partially conductive layer or a plurality of interleaved conductive and non-conductive layers). A number of measurement points (e.g., measurement points 401 and 402) may be provide on one or more of the layers to measure characteristics of the PUF coating, for example, by measuring voltage, impedance, of applying signals to the PUF coating. In an embodiment, dozens or hundreds of measurement points may selectively apply predetermined signals and predetermined signal patterns to the conductive layer, the measurement of which may provide analog or digital PUF data and/or binary 0 and 1 values based on comparison with thresholds. In addition to providing a PUF value, the application of signals to the PUF coating may also provide for tamper detection based on changes in sensed signal values. In some embodiments, the tamper detection may execute automatically as the resulting PUF value may not be successfully determined in response to a tamper attempt.

Figure 5A:
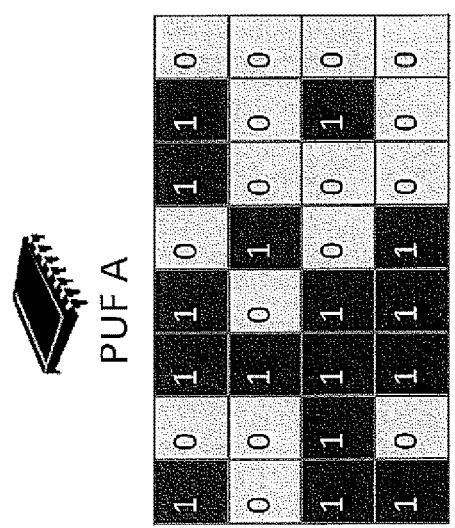
FIG. 5A depicts an exemplary memory-based physically unclonable function (PUF) in accordance with some embodiments of the present disclosure.

FIG. 5A depicts an exemplary memory-based physically unclonable function (PUF) in accordance with some embodiments of the present disclosure. A memory-based PUF may be constructed of a variety of memory technologies in a manner such that the physical memory structure (e.g., as implemented in silicon) returns to a default state in response to a standard condition, such as the application or removal of an operational voltage for the memory. For example, upon an initial startup condition in which voltage is applied to the memory, the bits representing the state of the memory may return to default state that is based on the structure of the underlying silicon and memory technology. In some embodiments, once the default PUF values are extracted from the memory-based PUF, the memory may be utilized in a normal manner (e.g., as RAM) to operate the device.

Figure 5B:
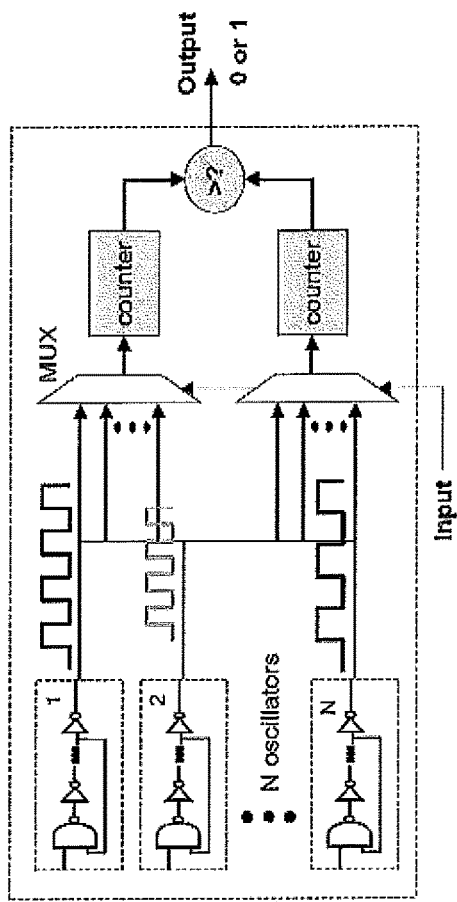
FIG. 5B depicts an exemplary ring oscillator-based physically unclonable function in accordance with some embodiments of the present disclosure.

FIG. 5B depicts an exemplary ring oscillator-based physically unclonable function in accordance with some embodiments of the present disclosure. A ring oscillator may operate at different frequencies based on manufacturing variances that occur during the fabrication of the ring oscillators. Although these frequency differences may not be functionally significant, they may occur with the required randomness, uniqueness, and per-PUF repeatability under default conditions to provide information that may be used to generate PUF values. In an exemplary embodiment, the ring-oscillator PUF values (e.g., binary 0 or 1 representing unique ID or key values) may be based on frequency comparisons for different ring oscillators.

In an exemplary embodiment, N ring oscillators may result in N! different orderings of the oscillators based on the relative frequency of each of the N oscillators. As a result of independent comparisons of these N oscillators, it may therefore be possible to generate $\log_2(N!)$ independent bits (e.g., 25 oscillators may produce 133 bits, 128 oscillators may produce 716 bits, and 256 oscillators may produce 1687 bits). One exemplary embodiment for querying the oscillators for these bits is depicted in FIG. 5B. Each of the oscillators 1 . . . N is coupled to two multiplexers. The multiplexers selectively provide different combinations of the oscillator outputs to respective counters for a suitable time (e.g., with sufficient resolution to provide different counter outputs for each of a range of frequencies for the ring oscillators, factoring in error correction for oscillators having frequencies of high similarity). For each combination of oscillators, the counter values may be provided to a comparator that outputs a 1 or a 0, based on which of the oscillators has the higher frequency as indicated by the counters. It will be understood that other processing possibilities may be provided such as a multiple sets of parallel-connected counters and comparators for faster processing or greater frequency resolution. Moreover, in some embodiments initial PUF values may be determined based on a lower sampling time, and if error correction is unable to extract an acceptable PUF value, additional sampling may be performed.

Figure 5C:
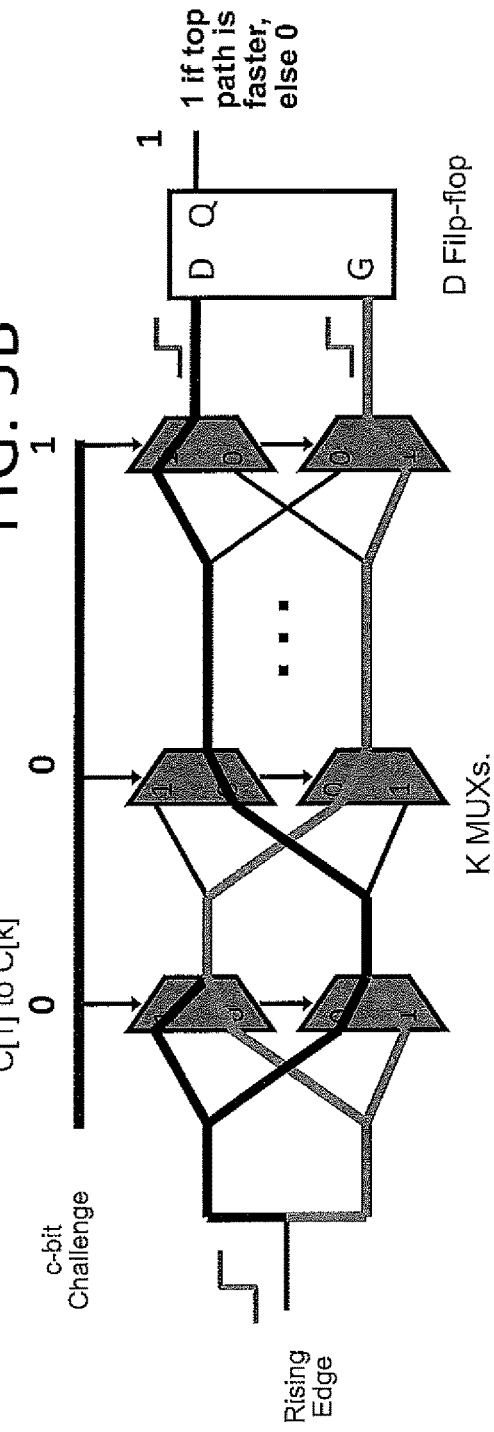
FIG. 5C depicts an exemplary arbiter-based physically unclonable function in accordance with some embodiments of the present disclosure.

FIG. 5C depicts an exemplary arbiter-based physically unclonable function in accordance with some embodiments of the present disclosure. Electronic components such as inverters, transistors, logic gates, diodes, multiplexers, and other similar components may have different delays that may not be critical for underlying signal processing operations but that may be utilized to create PUF data have required randomness, uniqueness, and per-PUF repeatability. In an exemplary embodiment, multiple delay paths may be provided through otherwise functionally identical components having different fabrication-based delays and PUF detection circuitry may compare the delays to determine PUF values. A number of delay elements and PUF detection circuitry may be selected in a manner that provides sufficient resolution based on the known delay variances that are imparted by the manufacturing process and the operation of the PUF detection circuitry. In an embodiment the inputs to the PUF detection circuitry may be set to an initial state based on one or more source signals provided to the delay elements, the source signal may be changed (e.g., a rising-edge signal), and the PUF value determined may be determined based on the relative time of arrival of the rising edge signal through multiple delay paths.

An exemplary embodiment of an arbiter-based PUF is depicted in FIG. 5C. In FIG. 5C, K sets of 2 parallel multiplexers are arranged in series. A c-bit challenge is provided to each set of multiplexers, which facilitates numerous delay paths through the multiplexers. Each multiplexer receives one of two source signals (e.g., identical rising edge source signals in the example of FIG. 5C, but other source signals may be provided with different delay elements and PUF detection circuitry), and selects which of the two signals to provide as an output based on the MUX input. The MUXes have complementary inputs such that each of the two source signals is propagated through the MUX chain. These outputs are then provided to each subsequent set of MUXes and eventually to PUF detection circuitry such as a D flip flop, which outputs a 1 or a zero based on which path through the MUXes (e.g., for a particular c-bit challenge). Different combinations of c-bit challenges may be provided to extract different PUF values for different MUX delay paths.

FIG. 6A depicts an exemplary line capacitance-based physically unclonable function measurement in accordance with some embodiments of the present disclosure. In an embodiment, the components and circuitry depicted in FIG. 6A may correspond to a capacitance monitoring system to detect capacitance of components such as a tamper mesh, chip card interface circuitry, or other components and circuitry of a device such as payment reader 22. In one embodiment, the capacitance monitoring system includes at least an oscillator (OSC), a reference capacitor ($C_{REF}$) and a capacitance measuring circuit to measure a capacitance ($C_{MEAS}$) associated with one or more components of the device.

In an exemplary device of a payment reader 22, the components of the capacitance monitoring system can be incorporated in the reader chip 100 and/or elsewhere in the payment reader 22. The capacitance monitoring system can be arranged as a capacitance divider that uses the capacitance measuring circuit to measure or determine changes in the component capacitance ($C_{MEAS}$). Different capacitance measurement points (e.g., from a tamper mesh, touchscreen, chip card interface, or other source) may be provided as $C_{MEAS}$. The capacitance measuring circuit can include a data acquisition circuit and one or more sensors. The oscillator (OSC) can provide an output signal at a single fixed frequency or at a variable frequency that can be varied or selected from a range of frequencies. In one embodiment, the output signal provided by the oscillator (OSC) can be supplied by a clock of the reader chip 100. In other embodiments, the oscillator (OSC) can provide a pulse that can be phase and/or amplitude shifted as desired. If the oscillator is providing a pulse as the output signal, then the capacitance measuring circuit may incorporate an A/D converter to digitize the corresponding measured signal, which can then be processed to determine a capacitance value. The reference capacitor ($C_{REF}$) can have a fixed capacitance in one embodiment. However, in other embodiments, the reference capacitor ($C_{REF}$) can have a variable capacitance that can be selected by a user. In one embodiment, the variable capacitance can be provided by selectively engaging and disengaging capacitors in a bank of capacitors to obtain the desired capacitance for the reference capacitor ($C_{REF}$).

The capacitance measuring circuit can measure the capacitance between one or more components. For example, the capacitance measuring circuit can selectively measure capacitances of a tamper mesh such as that depicted in FIG. 4, a touchscreen, or an interface such as a chip card interface as is depicted in FIG. 6B. For example, in FIG. 6B, the capacitance measuring circuit can measure the capacitance ($C_{MEAS}$) between any two pins of a chip card interface, such as the voltage interface 502, the reset interface 504, the clock interface 506, the I/O interface 508, the ground interface 510, the programming interface 512, or a parallel plate 514. The capacitance measuring circuit the measured component capacitance ($C_{MEAS}$) to the processing unit 120 for further processing and storage in memory 122. In one embodiment, the capacitance measuring circuit 402 can be operated in synchronicity with the clock and the oscillator (OSC) in order to perform phase-matched measurements.

In some embodiments, capacitance values may be used to establish PUF values based on absolute values (e.g., converting to a multi-bit digital value for capacitance) or comparisons between capacitances. Moreover, changes in capacitance may also provide tamper detection, as an attacker will often attempt to thwart a tamper mesh or gain access through components such as a card or user interface. In some embodiments, the processing unit 120 may establish a baseline for the component capacitance ($C_{MEAS}$) for each capacitance of the contact interface 104 to be monitored and then compare subsequent determinations of the component capacitance ($C_{MEAS}$) to the baseline that is stored in memory 122. In other embodiments, the use of the capacitance values for a PUF may provide automatic tamper detection, as tampering may prevent authentication and key generation.

FIG. 6C depicts an exemplary line time domain reflectometry-based physically unclonable function measurement in accordance with some embodiments of the present disclosure. Time domain reflectometry may be used to measure characteristics of any suitable signal path within the device and may provide information based on the amplitude, phase, and other characteristics of reflections. These characteristics may be used to generate PUF values based on individual characteristics of signal paths (e.g., multi-bit digital values or binary phase and/or amplitude comparisons) or based on comparisons of reflections between multiple signal paths. In some embodiments, such values may also be used for independent tamper detection based on changes in reflected characteristics (e.g., representing the introduction of unexpected elements into the signal path) or may provide automatic tamper detection based on the failure of PUF values generated therefrom to provide authentication and/or proper key generation.

In an embodiment, the components and circuitry depicted in FIG. 6C may correspond to a TDR monitoring system to determine characteristics of various signal paths that may be coupled to the TDR monitoring system (e.g., via a variety of multiplexed paths, etc.). In one embodiment, the TDR monitoring system 450 includes at least a TDR circuit 652, a transmitter, 654, a detector 656, and a coupler 658. The TDR circuit 652 may be coupled to a transmitter 654 to transmit a pulse or signal on a respective signal path 662 via a coupler such as a multiplexer. In some embodiments, multiple transmitters 654 can be coupled to transmit pulses on multiple signal paths simultaneously and comparison circuitry (not depicted) may be utilized to compare responses of similar signal paths to extract PUF values. In embodiments, the pulse or signal sent by the transmitter can be either an electrical signal or an optical signal.

The TDR circuit 652 can monitor the transmission of pulses and the corresponding reflections returned from the signal path 662. In addition to determining PUF values based on characteristic reflections, the TDR circuit may also identify tamper attempts and/or automatically change PUF values based on tamper attempts. For example, a pulse was transmitted to signal path 662 at time $T_0$ may provide a first expected or normal reflection response at time $T_1$. However, a second reflection may be received based on a tamper device 664 coupled to the signal path at location 660. As a result, the overall amplitude and/or phase of the response may be changed, resulting in determination of a tamper attempt or a change in the PUF value generated from the response.

Figure 7A:
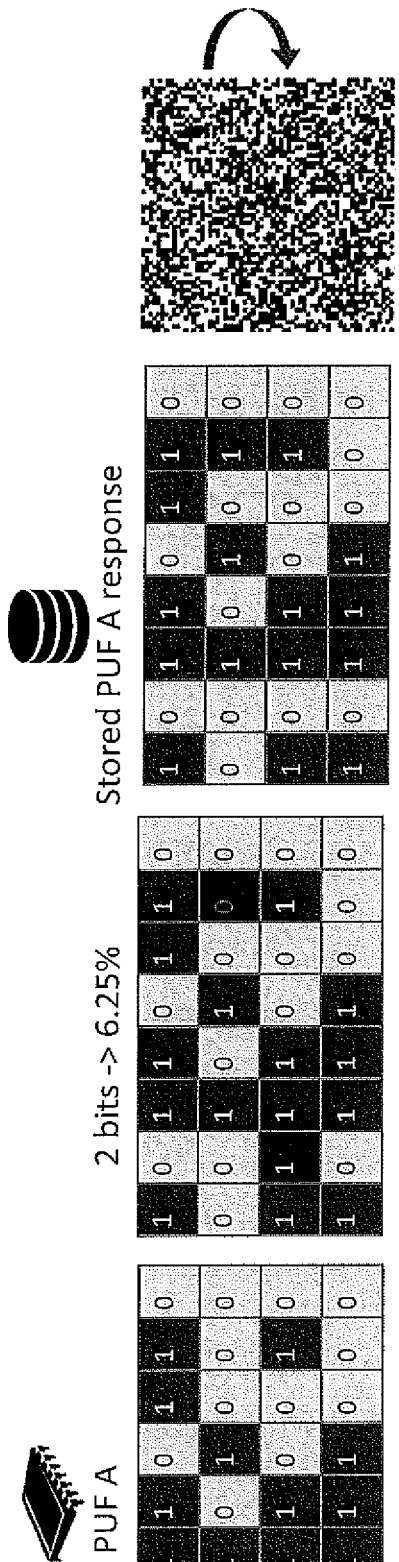
FIG. 7A depicts an exemplary PUF reliability determination in accordance with some embodiments of the present disclosure.

FIG. 7A depicts an exemplary PUF reliability determination in accordance with some embodiments of the present disclosure. Although the PUF reliability determination is based on an exemplary memory-based PUF, it will be understood that a similar determination may be made with a variety of suitable PUFs. As described herein, any PUF may not provide an identical response at all times and under all conditions. For example, differences in supply voltage, temperature, external noise sources, or wear over time may result in different marginal results for some PUF components (e.g., memory-based PUF values that drift over a threshold for a binary output, changes in delay time, changes in oscillator frequency, changes in capacitance, or changes in reflection characteristics). Accordingly, error correction procedures such as error correction codes may be used to extract usable PUF values from imperfect PUF results. It may be desirable to maintain a PUF error rate below a maximum which may dictate the selection of error correction procedures. In some embodiments there may be multiple allowable error rates for different operations or circumstances and an associated multiple error correction operations.

An error rate may be based on a comparison to a stored PUF response to a measured PUF response prior to error correction. The stored PUF response may be stored at a suitable location (e.g., created and stored during manufacturing, testing, or an initialization procedure) such as a remote server in order to prevent attacker access and local long-term storage of PUF values. In an embodiment, PUF values may be read from the PUF and transmitted in encrypted form for comparison to the stored PUF values (e.g., based on encryption provided by the error-corrected PUF itself or by other PUF sources). In the exemplary embodiment depicted in FIG. 7A, the error rate of 6.25% corresponds to two error bits. Based on the error rate it may be determined whether the PUF source may continue to be used to generate PUF values. In some embodiments, PUF values may be monitored over time to identify PUF error patterns. If only certain subsets of bits repeatedly supply errors and a sufficient number of correct bits remain, the error bits may be ignored. Error correction procedures may be modified or updated based on probabilities or patterns in error bits, and additional PUF sources may be introduced or combined with the initial PUF source to provide additional PUF values.

Figure 7B:
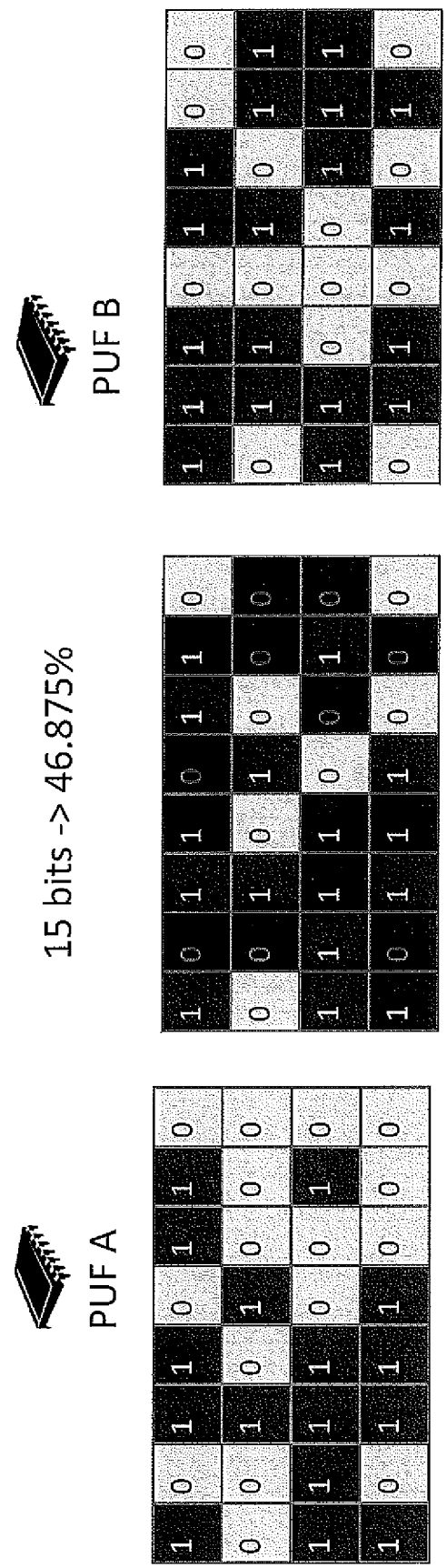
FIG. 7B depicts an exemplary PUF uniqueness determination in accordance with some embodiments of the present disclosure.

FIG. 7B depicts an exemplary PUF uniqueness determination in accordance with some embodiments of the present disclosure. As described herein, it may be desirable that the PUFs exhibit a threshold level of uniqueness between different particular PUFs of a single PUF source type. Although such a uniqueness analysis may be performed for any suitable PUF, in the exemplary embodiment, of FIG. 7B two memory-type PUFs may be compared to determine whether the PUF is sufficiently unique to function as a PUF (e.g., a predictable PUF may be easier to attack). As described herein, a PUF may have components that are fabricated with non-deterministic differences that can be analyzed to create a suitable PUF source. In an exemplary embodiment, PUF sources may be analyzed at one or more times (e.g., prior to installation in the device, after installation in the device, in the field based on information transmitted from multiple devices to servers, etc.) to determine whether the required uniqueness between PUFs exists. In some embodiments, multiple PUF sources of the same type (e.g., memory devices, delay elements, oscillators, tamper meshes, capacitive features, signal path features, etc.) to confirm whether different devices have a high enough degree of uniqueness—e.g., such that each device has at least a threshold % of differences with any other device (e.g., 45%, 48%, 49%, etc.) and that no portions of the device (e.g., a particular subset of memory regularly have a single value over numerous multiple devices. Depending on uniqueness values determined, the PUF may be used for only limited purposes (e.g., lower security operations or values) or other PUF sources may be utilized. In some embodiments, uniqueness and other measured values may be weighed against other aspects of PUF operation such as a security score (e.g., based on difficulty of accessing the PUF and/or tamper protections for the PUF (PUF-enabled or peripheral), lack of variances under operating conditions, etc.). In some embodiments where PUF data is compared to thresholds or other data, or is based on input stimulus such as signals, aspects of the thresholds or inputs may be modified to adjust the uniqueness.

Figure 8A:
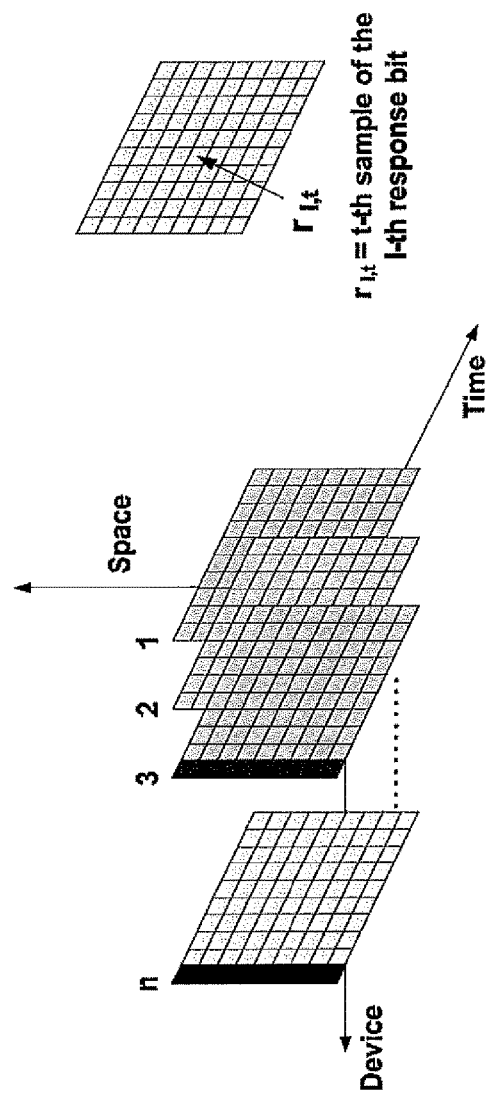
FIG. 8A depicts an exemplary PUF randomness determination in accordance with some embodiments of the present disclosure.
Figure 8B:
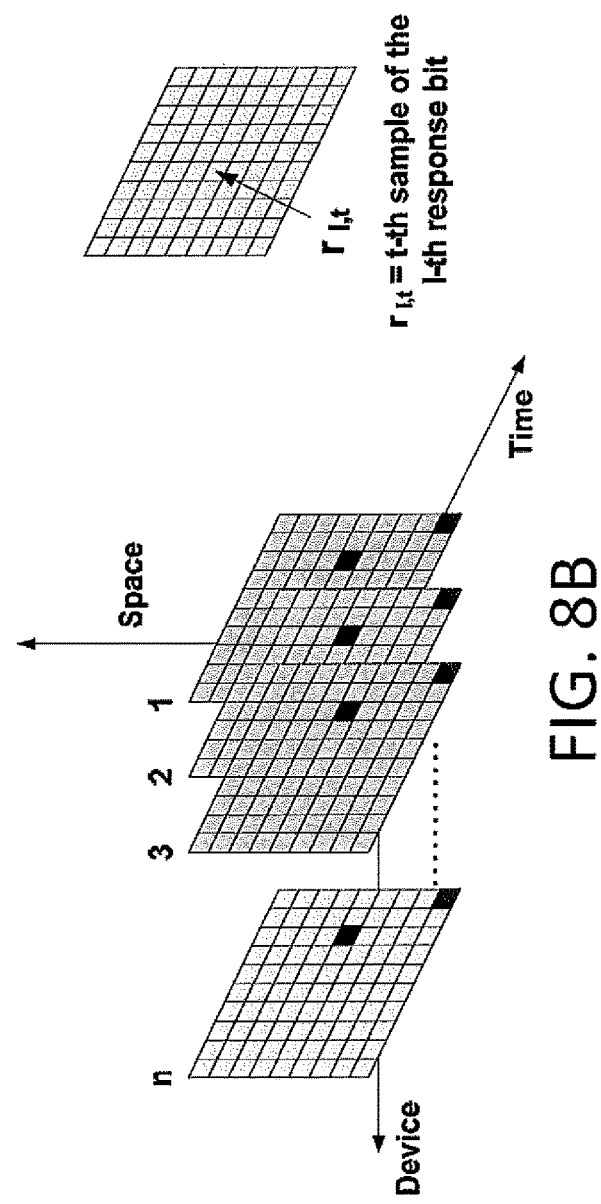
FIG. 8B depicts an exemplary PUF bit-aliasing determination in accordance with some embodiments of the present disclosure.

FIG. 8A depicts an exemplary PUF randomness determination in accordance with some embodiments of the present disclosure. In addition to providing values that are reproducible and unique, it may be desirable to ensure that a particular PUF source exhibits a sufficient degree of randomness in how the unique PUF values are distributed. Thus, even if a PUF source provides values that appear to be unique vis-à-vis other PUF sources of the same type, the PUF source may not provide randomness in the distribution of those PUF values (e.g., as a result of portions or sections having changing PUF values in a similar way). Accordingly, an ideal PUF source should ultimately supply PUF values that have an equal ability to provide a 1 or 0 response. As depicted in FIG. 8A, 1-n devices are represented as defining a bit space. Changing any one bit in a challenge (e.g., for certain PUF types that utilize challenge bits) should alter approximately half of the response bits. FIG. 8B depicts an exemplary PUF bit-aliasing determination in accordance with some embodiments of the present disclosure. Similar to the randomness determination, any bit or set of bits should have approximately 50% probability of having a PUF value of 0 or 1. As is depicted in FIG. 8B. any particular bit location within a bit space for a set of devices 1-n can be identified for PUF sources of the same type, and should have a value that exceeds a bit aliasing threshold (e.g., 45%, 48%, 49%, etc.) Checks for randomness and bit aliasing may be performed at various times, including during manufacturing or based on tests performed at devices and information provided from multiple devices to servers. Depending on randomness values determined, the PUF may be used for only limited purposes (e.g., lower security operations or values) or other PUF sources may be utilized. In some embodiments, randomness and other measured values may be weighed against other aspects of PUF operation such as a security score (e.g., based on difficulty of accessing the PUF and/or tamper protections for the PUF (PUF-enabled or peripheral), lack of variances under operating conditions, etc.). In some embodiments where PUF data is compared to thresholds or other data, or is based on input stimulus such as signals, aspects of the thresholds or inputs may be modified to adjust the randomness.

Figure 9A:
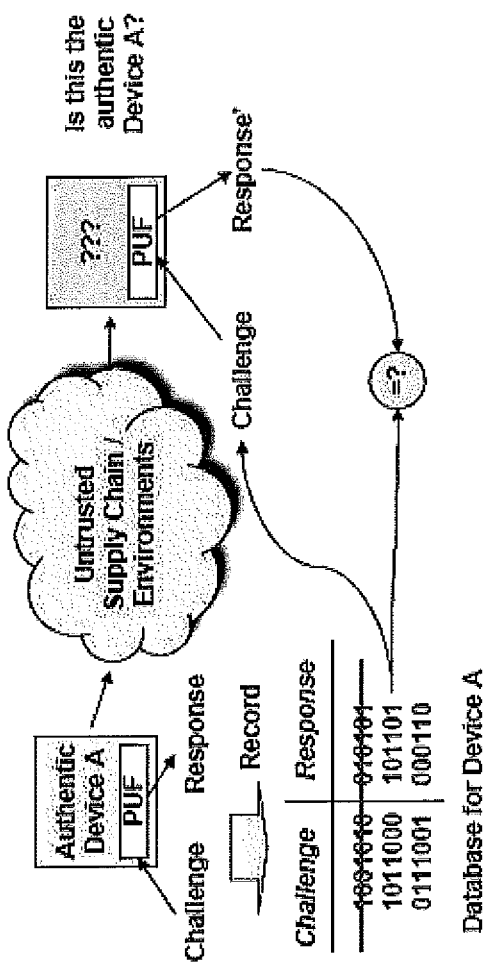
FIG. 9A depicts an exemplary diagram of a process flow for device authentication based on a PUF in accordance with some embodiments of the present disclosure.

FIG. 9A depicts an exemplary diagram of a process flow for device authentication based on a PUF in accordance with some embodiments of the present disclosure. During an initialization or other setup of a particular Device A, a series of challenges and responses may be provided to the PUF and recorded, for example, within a memory device or at a remote device. Because the internal structure of a PUF source of Device A causes particular responses, these challenge and response values may be provided to an internal PUF or remote device to determine whether the PUF is authentic, i.e., it can return the proper responses to particular challenges. Because the challenges and responses are unknown except to the device that originally stored the challenges and responses, the authenticity of Device A can be confirmed by issuing sets of challenges and determining whether the corresponding responses match (e.g., whether a current response matches a previous response).

Figure 9B:
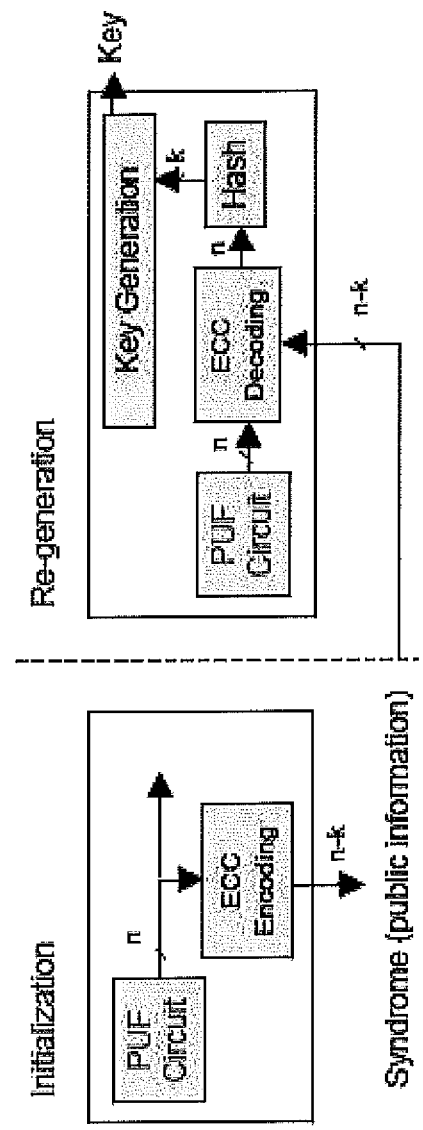
FIG. 9B depicts an exemplary diagram of a process flow for PUF initialization and key generation in accordance with some embodiments of the present disclosure.

FIG. 9B depicts an exemplary diagram of a process flow for PUF initialization and key generation in accordance with some embodiments of the present disclosure. To the left side of FIG. 9B is depicted an initialization procedure for a particular PUF source. The PUF values are output to an error correction code encoding circuit which creates error correction codes for the particular PUF output. Once the ECC is initialized with an error correction code, the PUF source may be operated in the field to generate a key. As depicted on the right side of FIG. 9B, a PUF source is queried and outputs PUF values. Those PUF values are provided to a ECC decoding circuit that applies ECC decoding to the PUF values. The ECC-encoded PUF values may function as a key or other identifier, or in an embodiment as depicted in FIG. 9B, hashed and provided as an input to a key generation algorithm. If the PUF is operational within the limitations of the ECC decoding (i.e., the PUF values output during re-generation, after ECC decoding, match the PUF values from initialization), the key may be utilized for encrypted communications between the device having the PUF source and other devices with the correct PUF-based key.

Figure 10A:
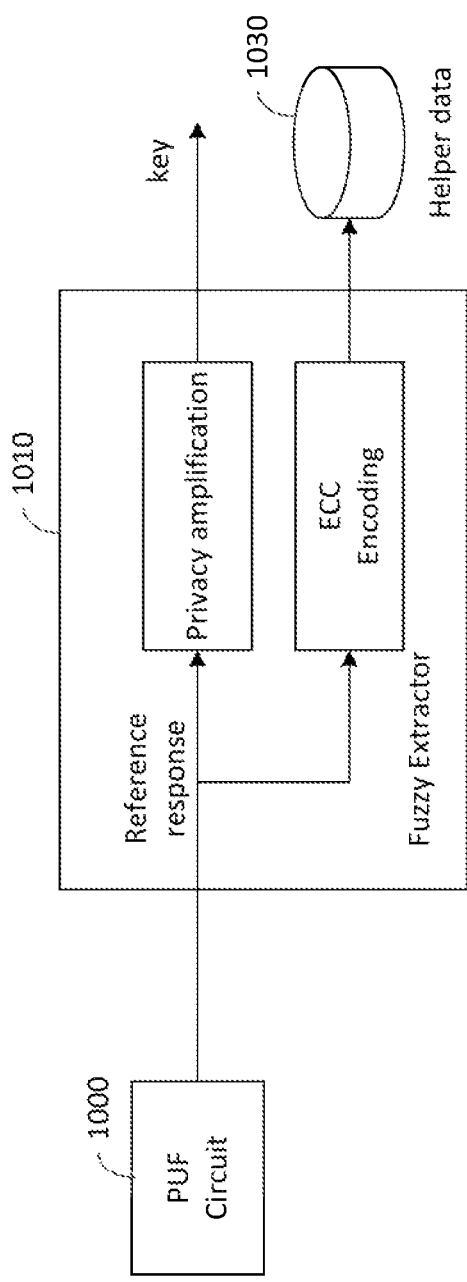
FIG. 10A depicts an exemplary diagram of a process flow for PUF key initialization in accordance with some embodiments of the present disclosure.

FIG. 10A depicts an exemplary diagram of a process flow for PUF source initialization with a fuzzy extractor in accordance with some embodiments of the present disclosure. As is depicted in FIG. 10A, a PUF source 1000 may output a reference response to a fuzzy extractor 1010. The fuzzy extractor 1010 may collectively perform key generation and ECC encoding. The key generation may be performed based on a privacy amplification process, which may compress and/or hash the PUF values to create a full-entropy cryptographic key. The fuzzy extractor may also create a public syndrome mask that may be stored at the device as public helper data 1030 for ECC decoding.

Figure 10B:
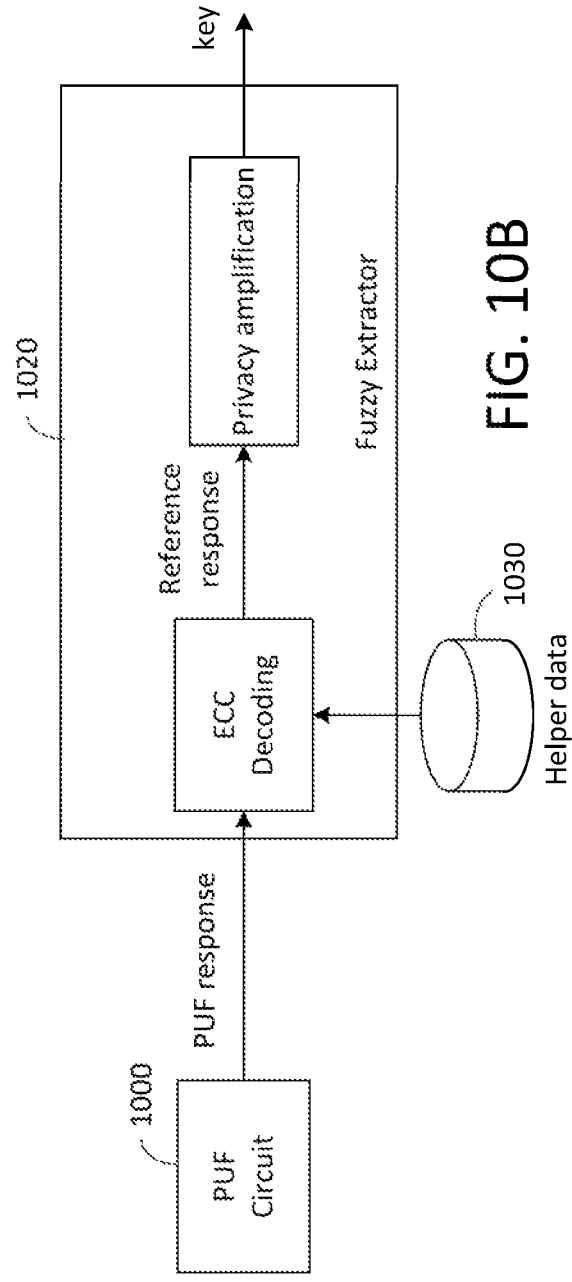
FIG. 10B depicts an exemplary diagram of a process flow for PUF key reconstruction in accordance with some embodiments of the present disclosure.

FIG. 10B depicts an exemplary diagram of a process flow for PUF key reconstruction in accordance with some embodiments of the present disclosure. A similar fuzzy extractor 1020 may work in conjunction with the PUF source 1000, ECC decoding, and helper data 1030 to create a corrected reference response based on the PUF response and ECC decoding. The privacy amplification process may then be executed on the corrected PUF data to generate the key. If the PUF is operational within the limitations of the ECC decoding (i.e., the PUF values output during re-generation, after ECC decoding, match the PUF values from initialization), the key may be utilized for encrypted communications between the device having the PUF source and other devices with the correct PUF-based key.

Figure 11:
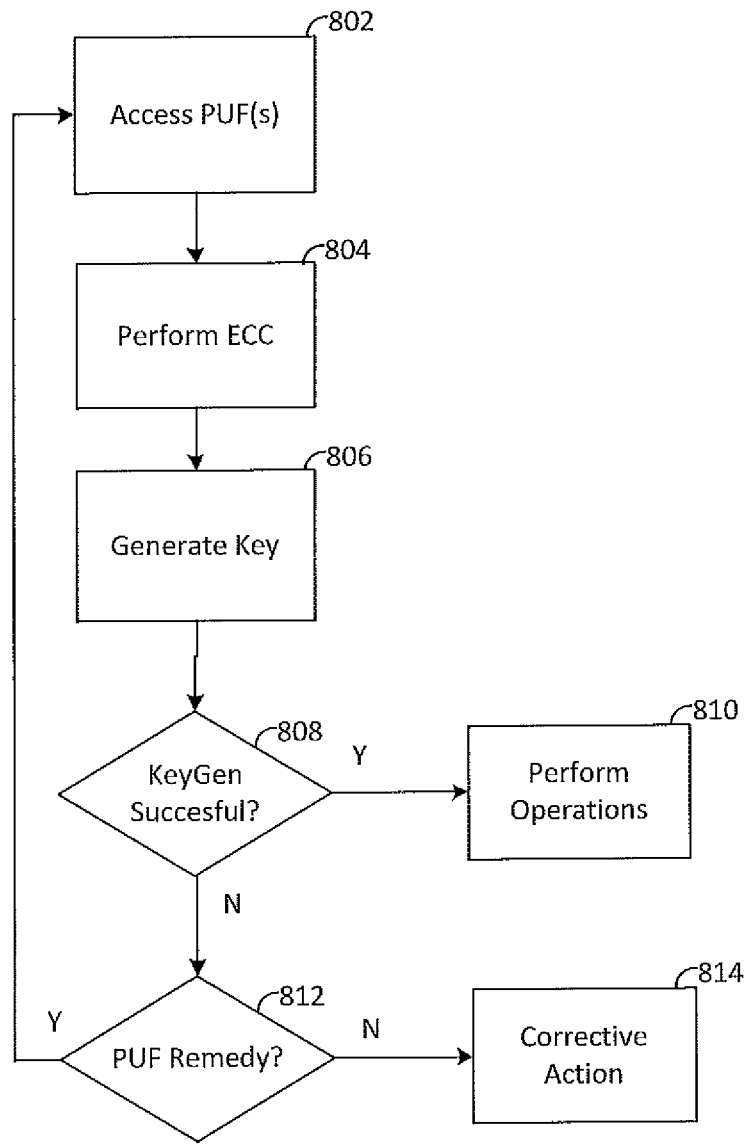
FIG. 11 depicts an exemplary flow diagram of PUF-based device protection in accordance with some embodiments of the present disclosure.
Figure 12:
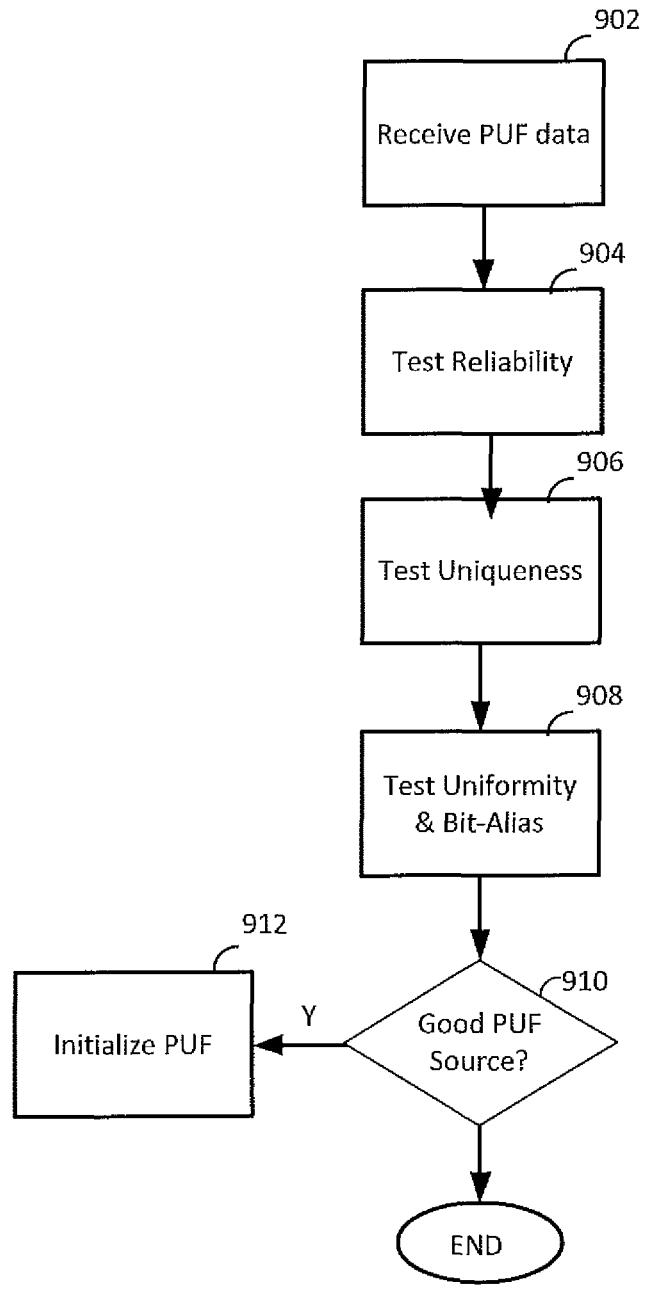
FIG. 12 depicts an exemplary flow diagram of PUF source selection in accordance with some embodiments of the present disclosure.

In view of the structures and devices described supra, methods that can be implemented in accordance with the disclosed subject matter will be better appreciated with reference to the flowcharts of FIGS. 11-12. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 11 depicts exemplary steps for utilizing PUFs for device security in a device in accordance with some embodiments of the present disclosure. At step 802, one or more PUF data sources may be accessed as described herein. As described herein, multiple PUF data sources may be accessible in a single device. In some embodiments, the selection of the PUF sources may be based on a particular use case for the PUF, such as for ID, authentication, tamper detection, encryption, key generation, seed values, or other similar operations. Once the PUFS are accessed, processing may continue to step 804.

At step 804, error correction may be performed on the accessed PUF data as described herein. In some embodiments, the error correction may be tiered for different PUF sources, applications, or use cases. In some cases, multiple error correction results may be provided for particular PUFs and different security levels or operations performed based on the success of different types or levels of error correction. For example, a low-resilience error correction (e.g., requiring higher-accuracy PUF data) may be utilized for critical security operations while a higher-resilience error correction (e.g., requiring lower-accuracy PUF data) may be utilized for less critical operations. For example, a single PUF source may provide PUF data to both ECCs, and only particular operations may be performed based on which ECC successfully processes the data.

As a further example, a first ECC may be capable of correcting up to a first threshold number of errors in the PUF data, and a second ECC may be capable of correcting up to a second threshold number of errors in the PUF data. If the first ECC is able to successfully correct each error in the PUF data, then a first set (one or more) secure operations may be permitted. If the second ECC is able to successfully correct each error in the PUF data, then a second set (one or more) secure operations may be permitted. In some embodiments, a tamper event may result in a change to the PUF data acquired from the PUF source such that a given ECC is unable to successfully correct each error in the PUF data. The inability of the ECC to successfully correct at least some of the errors in the PUF data may be used to identify an occurrence of the tamper event. In other examples, other techniques for performing error correction and using the results of the error correction processes may be used.

At step 806, information such as a key may be generated from the PUF values that are output at steps 802 and 804. In some embodiments, multiple PUF values from multiple sources may be used to generate a single key or multiple keys, based on multiple levels of key generation steps. PUF values may be also be used for various other purposes such as providing digital signatures, identifying tamper attempts, and various other data and processing operations as described herein.

At step 808, it may be determined whether the generation of information (e.g., a key) has been successful. This may be based on information such as raw PUF values, error correction results, communications with other processes or devices, or other similar operations. If all of the information was generated successfully, processing may continue to step 810 and processing operations may be performed based on the PUF-generated information. If all information was not generated successfully, processing may continue to step 812.

At step 812 it may be determined whether there is a possible remedy for the PUF-generated information that was not successfully generated, such as applying alternative ECC operations, accessing an alternative PUF source, lowering a security or other operational tier, performing additional attempts with the same PUF source and ECC, or other similar operations as described herein. If a possible remedy is available, processing may return to step 802 based on any revised parameters, if any. If a possible remedy is not available, processing may continue to step 814.

At step 814, one or more corrective actions may be applied to the device. In some embodiments, a choice of corrective action may be based on which of multiple tiered PUF sources and/or tiered ECC operations successfully generated PUF-generated information, if any. Different corrective actions of different severities may be applied based on such tiered successful operations, as well on as other available data such as number of failed attempts, operational or environmental data associated with the device, the circumstances (e.g., transaction processing operations, location, time of day, etc.) of the device, and information and commands provide by other devices such as a server or merchant device. Corrective action can include various operations as described herein, including but not limited to disabling access to PUF sources, destroying PUF source, disabling access to communication interfaces, providing error messages, providing error displays, providing countermeasures to interfere with tamper devices, disabling access to cryptographic processes, destroying memory devices or erasing critical information described therein, requesting a firmware update, providing detailed log data to a remote server, and other similar operations. Once corrective action has been taken at step 814, the processing of FIG. 11 may end.

FIG. 12 depicts steps for testing, establishing, and initializing a PUF source and ECC in accordance with some embodiments of the present disclosure. Although steps of FIG. 12 may be described as being applied to a single PUF source, it will be understood that the steps of FIG. 12 may be applied to multiple PUF sources and/or types at the same time, e.g., to test the operation of the PUF sources and types together and in multi-step PUF processing operations.

At step 902 data may be obtained from a PUF source as described herein. Data may be obtained directly from the PUF source by applying relevant initial conditions to the PUF source as well as applying relevant signals (e.g., challenge data) to the PUF source. In some embodiments, a similarly configure PUF source type (e.g., a similarly manufactured SRAM, arbiter, oscillator, capacitive circuit, TDR circuit, etc.) may be in multiple similar devices, and data may be acquired from a variety of PUF sources from different devices. In addition, data may be obtained from any PUF source repeatedly and under different environmental and operating conditions. In some embodiments, ECC test codes or a variety of ECC types may be applied to the PUF data. In this manner, a variety of data may be acquired from the PUF source or PUF sources to facilitate different PUF testing operations in steps 904, 906, and 908. For example, in step 904 reliability testing may be performed as described herein, e.g., based on multiple data acquisition steps of PUF data from the same PUF source and under a variety of operating, environmental, and ECC conditions. At step 906, multiple PUFs may be examined as described herein, based on multiple sets of PUF data from multiple PUF sources, and under a variety of operating, environmental, and ECC conditions. At step 908, PUF uniformity and bit-alias may be tested as described herein, based on multiple sets of PUF data from multiple PUF sources, and under a variety of operating, environmental, and ECC conditions. In addition, other relevant tests may be applied to PUF source or sources such as to determine life cycle effects and other responses.

At step 910 it may be determined whether a particular PUF source or PUF sources are a suitable PUF source. In some embodiments, the various test results may be weighted to arrive at an overall PUF score representing the quality of the PUF source as a PUF. In some embodiments, certain tests may have minimum threshold values under which a PUF source must be rejected, such as a minimum reliability. In some embodiments PUF sources or ECC applied to PUF sources may be selected from tiered operation based on the outcome of step 910. If at step 910 it is determined that the PUF source is a suitable source for some purpose, processing may continue to step 912. If not processing may end. At step 912, the PUF source may be initialized as described herein, for example by generating information such as associated ECC values for the PUF based on operations such as performed by a fuzzy extractor. Once the PUF source and other information are initialized, the processing of FIG. 12 may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for a device to engage in secure operations, the device having a physically unclonable function ("PUF") source configured to provide PUF data, comprising:
   acquiring the PUF data from the PUF source, wherein the PUF source is configured such that the PUF data provided by the PUF source changes in response to the PUF source experiencing a tamper attempt;
   correcting, at first error correction code circuitry of the device, the acquired PUF data based on an error correction code, wherein the error correction code is capable of correcting up to a threshold number of errors in the acquired PUF data;
   performing, by processing circuitry of the device, secure operations based on the corrected PUF data;
   correcting, at second error correction code circuitry of the device, the acquired PUF data based on a second error correction code, wherein the second error correction code is capable of correcting up to a second threshold number of errors in the acquired PUF data;
   performing, by the processing circuitry of the device, second secure operations based on the second corrected PUF data; and
   identifying, by the processing circuitry, the tamper attempt when the first error correction code is not capable of correcting each error in the acquired PUF data.

2. A method for a device to engage in secure operations, comprising:
   acquiring, from a physically unclonable function ("PUF") source of the device, PUF data, wherein the PUF source is associated with predetermined PUF data, and wherein the PUF source is configured such that the predetermined PUF data changes in response to the PUF source experiencing a tamper attempt;
   correcting, at error correction code circuitry of the device, the PUF data based on an error correction code, wherein the error correction code is capable of correcting up to a threshold number of errors in the PUF data as compared to the predetermined PUF data;
   performing, by the processing circuitry of the device, secure operations based on the corrected PUF data;
   determining, by the processing circuitry, when an error correction capacity of the error correction code for the PUF data has been exceeded by errors in the PUF data; and
   detecting, by the processing circuitry, the tamper attempt in response to the determining.

3. The method of claim 2, wherein the PUF source comprises a memory device, an oscillator, an arbiter, a capacitance sensing circuit, or a time-domain reflection circuit.

4. The method of claim 2, further comprising:
   acquiring, from a second PUF source of the device, second PUF data, wherein the second PUF source is associated with predetermined second PUF data.

5. The method of claim 4, wherein the PUF source and the second PUF source are of different PUF source types.

6. The method of claim 5, wherein each of the PUF source types is selected from the group comprising a memory device, an oscillator, an arbiter, a capacitance sensing circuit, or a time-domain reflection circuit.

7. The method of claim 4, further comprising:
   combining the PUF data and the second PUF data prior to the correcting, wherein the correcting corrects the combined PUF data and second PUF data.

8. The method of claim 4, further comprising:
   correcting, at second error correction code circuitry of the device, the second PUF data based on a second error correction code, wherein the second error correction code is capable of correcting up to a threshold number of errors in the second PUF data as compared to the predetermined second PUF data; and
   performing, by the processing circuitry of the device, second secure operations based on the second corrected PUF data.

9. A method for a device to engage in secure operations, comprising:
   acquiring PUF data from a physically unclonable function ("PUF") source of the device, wherein the PUF source is associated with predetermined PUF data, and wherein the PUF source is configured such that the predetermined PUF data changes in response to the PUF source experiencing a tamper attempt;
   correcting, at first error correction code circuitry of the device, the PUF data based on a first error correction code thereby providing first corrected PUF data, wherein the first error correction code is capable of correcting up to a first threshold number of errors in the PUF data as compared to the predetermined PUF data;
   performing, by processing circuitry of the device, secure operations based on the first corrected PUF data; and
   correcting, at second error correction code circuitry of the device, the PUF data based on a second error correction code thereby providing second corrected PUF data, wherein the second error correction code is capable of correcting up to a second threshold number of errors in the PUF data as compared to the predetermined PUF data.

10. The method of claim 9, further comprising:
    performing, by the processing circuitry of the device, second secure operations based on the second corrected PUF data.

11. The method of claim 10, further comprising:
    identifying, by the processing circuitry, the tamper attempt when the error correction code is not capable of correcting the errors in the PUF data.

12. The method of claim 9, further comprising:
   determining, by the processing circuitry, whether the first error correction code successfully corrects each error in the PUF data;
   if the first error correction code is determined to correct each error in the PUF data, performing a first set of secure operations with the processing circuitry;
   determining, by the processing circuitry, whether the second error correction code successfully corrects each error in the PUF data; and
   if the second error correction code is determined to correct each error in the PUF data, performing a second set of secure operations with the processing circuitry.

13. A method for a device to engage in secure operations, the device having a physically unclonable function ("PUF") source configured to provide PUF data, comprising:
   acquiring the PUF data from the PUF source, wherein the PUF source is configured such that the PUF data provided by the PUF source changes in response to the PUF source experiencing a tamper attempt;
   correcting the acquired PUF data based on an error correction code;
   performing, by processing circuitry of the device, secure operations based on the corrected PUF data;
   determining, by the processing circuitry, whether an error correction capacity of the error correction code for the acquired PUF data has been exceeded by errors in the acquired PUF data; and
   detecting, by the processing circuitry, the tamper attempt based on the determining.

14. The method of claim 13, further comprising:
   identifying, by the processing circuitry, the tamper attempt based on a change to the PUF data provided by the PUF source.

15. The method of claim 13, further comprising:
   acquiring second PUF data from a second PUF source of the device, wherein the second PUF source is configured such that the second PUF data provided by the second PUF source changes in response to the PUF source experiencing a tamper attempt, and wherein the PUF source and the second PUF source are of different PUF source types; and
   combining the PUF data and the second PUF data.

16. The method of claim 15, wherein each of the PUF source types is selected from the group comprising a memory device, an oscillator, an arbiter, a capacitance sensing circuit, or a time-domain reflection circuit.

17. A method for a device to engage in secure operations, the device having a physically unclonable function ("PUF") source configured to provide PUF data, comprising:
   acquiring the PUF data from the PUF source, wherein the PUF source is configured such that the PUF data provided by the PUF source changes in response to the PUF source experiencing a tamper attempt;
   correcting the acquired PUF data based on a first error correction code, wherein the first error correction code is capable of correcting up to a first threshold number of errors in the acquired PUF data;
   performing, by processing circuitry of the device, secure operations based on the first corrected PUF data; and
   correcting the acquired PUF data based on a second error correction code, wherein the second error correction code is capable of correcting up to a second threshold number of errors in the acquired PUF data.

18. The method of claim 17, further comprising:
   determining, by the processing circuitry, whether to perform at least one secure operation based on whether the second error correction code successfully corrects each error in the acquired PUF data.

19. A device for engaging in secure operations, comprising:
   a physically unclonable function ("PUF") source;
   processing circuitry configured to acquire the PUF data from the PUF source and to use the PUF data to perform secure operations, wherein the PUF data acquired from the PUF source changes in response to the PUF source experiencing a tamper attempt; and
   error correction code circuitry configured to correct errors in the acquired PUF data based on error correction code prior to use of the PUF data in the secure operations,
   wherein the processing circuitry is configured to determine when an error correction capacity of the error correction code for the PUF data is exceeded by errors in the PUF data, and wherein the processing circuitry is configured to detect the tamper attempt in response to a determination that the error correction capacity has been exceeded by the errors.

20. A device for engaging in secure operations, comprising:
   a physically unclonable function ("PUF") source;
   processing circuitry configured to acquire the PUF data from the PUF source and to use the PUF data to perform secure operations, wherein the PUF data acquired from the PUF source changes in response to the PUF source experiencing a tamper attempt; and
   first error correction code circuitry configured to correct errors in the acquired PUF data prior to use of the PUF data in the secure operations, wherein the first error correction code circuitry is configured to correct errors in the acquired PUF data based on first error correction code that is capable of correcting up to a first threshold number of errors in the acquired PUF data;
   second error correction circuitry configured to correct errors in the acquired PUF data based on second error correction code that is capable of correcting up to a second threshold number of errors in the acquired PUF data.

21. The device of claim 20, wherein the processing circuitry is configured to determine whether to perform at least one secure operation based on whether the second error correction code successfully corrects each error in the acquired PUF data.

22. The device of claim 19, further comprising:
   a second PUF source configured to provide second PUF data, wherein the second PUF source is configured such that the second PUF data provided by the second PUF source changes in response to the second PUF source experiencing a tamper attempt, wherein the processing circuitry is configured to combine the PUF data and the second PUF data, and wherein the PUF source and the second PUF source are of different PUF source types.

23. The device of claim 22, wherein each of the PUF source types is selected from the group comprising a memory device, an oscillator, an arbiter, a capacitance sensing circuit, or a time-domain reflection circuit.

* * * * *